(12) United States Patent
Zhang et al.

(10) Patent No.: US 12,439,055 B2
(45) Date of Patent: Oct. 7, 2025

(54) METHODS AND SYSTEMS FOR VIDEO CODING

(71) Applicant: ZHEJIANG DAHUA TECHNOLOGY CO., LTD., Zhejiang (CN)

(72) Inventors: Xue Zhang, Hangzhou (CN); Dong Jiang, Hangzhou (CN); Chunmei Nian, Hangzhou (CN); Jucai Lin, Hangzhou (CN); Jun Yin, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 135 days.

(21) Appl. No.: 18/171,304

(22) Filed: Feb. 17, 2023

(65) Prior Publication Data

US 2023/0209065 A1    Jun. 29, 2023

Related U.S. Application Data

(63) Continuation of application No. PCT/CN2022/076540, filed on Feb. 17, 2022.

(30) Foreign Application Priority Data

Feb. 22, 2021 (CN) .......................... 202110200049.1
Jul. 2, 2021   (CN) .......................... 202110751426.0

(51) Int. Cl.
*H04N 19/14*   (2014.01)
*H04N 19/182*  (2014.01)
(Continued)

(52) U.S. Cl.
CPC .......... *H04N 19/14* (2014.11); *H04N 19/182* (2014.11); *H04N 19/186* (2014.11); *H04N 19/82* (2014.11)

(58) Field of Classification Search
CPC .. H04N 19/105; H04N 19/117; H04N 19/136; H04N 19/14; H04N 19/182; H04N 19/186; H04N 19/82
(Continued)

(56) References Cited

U.S. PATENT DOCUMENTS

2016/0105685 A1   4/2016  Zou et al.
2016/0309184 A1  10/2016  Choe et al.
(Continued)

FOREIGN PATENT DOCUMENTS

CN   105141948 A   12/2015
CN   110944175 A    3/2020
(Continued)

OTHER PUBLICATIONS

First Office Action in Chinese Application No. 202110751426.0 mailed on Apr. 2, 2022, 14 pages.
(Continued)

*Primary Examiner* — Behrooz M Senfi
(74) *Attorney, Agent, or Firm* — METIS IP LLC

(57) ABSTRACT

The present disclosure may relate to a system and a method for video coding. The method may include determining at least one classification mode of a first component of a first pixel for a block in an image frame based on at least one pixel value of at least one second component of at least one second pixel that surrounds the first pixel. The method may also include generating a target classification result by classifying the first component based on at least a portion of the at least one classification mode. The method may also include compensating the first component based on an optimal compensation value of the target classification result.

19 Claims, 16 Drawing Sheets

(51) Int. Cl.
*H04N 19/186* (2014.01)
*H04N 19/82* (2014.01)

(58) Field of Classification Search
USPC .................................................. 375/240.02
See application file for complete search history.

(56) References Cited

U.S. PATENT DOCUMENTS

| | | |
|---|---|---|
| 2018/0063527 A1 | 3/2018 | Chen et al. |
| 2018/0352233 A1 | 12/2018 | Alshina et al. |
| 2019/0327494 A1 | 10/2019 | Dong et al. |
| 2020/0036971 A1 | 1/2020 | Sim et al. |
| 2021/0092368 A1 | 3/2021 | Du et al. |
| 2021/0329261 A1 | 10/2021 | Ma et al. |
| 2021/0360238 A1 | 11/2021 | Chen et al. |
| 2022/0038726 A1* | 2/2022 | Kuo ............. H04N 19/44 |
| 2022/0256145 A1 | 8/2022 | Huang et al. |
| 2022/0345699 A1 | 10/2022 | Ma et al. |

FOREIGN PATENT DOCUMENTS

| | | | | |
|---|---|---|---|---|
| CN | 110944188 A | | 3/2020 | |
| CN | 112514401 A | | 3/2021 | |
| CN | 112637590 A | | 4/2021 | |
| CN | 113099221 A | * | 7/2021 | ........... H04N 19/103 |
| CN | 113469977 A | | 10/2021 | |
| CN | 113489977 A | * | 10/2021 | ........... H04N 19/117 |
| WO | 2019031703 A1 | | 2/2019 | |
| WO | 2021025168 A1 | | 2/2021 | |

OTHER PUBLICATIONS

International Search Report in PCT/CN2022/076540 mailed on Apr. 28, 2022, 6 pages.
Written Opinion in PCT/CN2022/076540 mailed on Apr. 28, 2022, 6 pages.
Telecommunication Standardization Sector of ITU, ITU-T H.265, 2015, 635 pages.
Jian, Yunrui et al., Enhanced Cross Component Sample Adaptive Offset for AVS3, IEEE Visual Communications and Image Processing(VCIP), 2022, 5 pages.
Ma, Tsung-Chuan et al., CE5-related: Joint Clip Operation for CCALF and Chroma ALF, Joint Video Experts Team (JVET) of ITU-T SG 16 WP 3 and ISO/IEC JTC 1/SC 29/WG 11, JVET-Q0494, 2020, 3 pages.
Krit Panusopone et al., Ccalf Coefficient Derivation Using Combined Neighbors, 2020 IEEE International Conference on Image Processing(ICIP), 1133-1136, 2020.
Kiran Misra et al., Cross-Component Adaptive Loop Filter for Chroma, Joint Video Experts Team(JVET) of ITU-T SG 16 WP 3 and ISO/IEC JTC 1/SC 29/WG 11, JVET-O0636_r1, 2019, 9 pages.
Yang, Hua et al., CE5-related: Joint Chroma Cross-Component Adaptive Loop Filtering, Joint Video Experts Team (JVET) of ITU-T SG 16 WP 3 and ISO/IEC JTC 1/SC 29/WG 11, JVET-P0372-v7, 2019, 9 pages.
Kiran Misra et al., On Cross Component Adaptive Loop Filter for Video Compression, 2019 Picture Coding Symposium(PCS), 2020, 5 pages.

* cited by examiner

200

210 — Determining at least one classification mode of a first component of a first pixel for a block in an image frame based on at least one pixel value of at least one second component of at least one second pixel that surrounds the first pixel

220 — Generating a target classification result by classifying the first component based on at least a portion of the at least one classification mode and compensating the first component based on an optimal compensation value of the target classification result

1110 — Determining a first adjustment value of a first component of a first pixel for a block in an image frame by processing, using at least one filter, a pixel value of a second component of a second pixel corresponding to the first component and at least one pixel value of at least one third component of at least one third pixel adjacent to the second pixel 1120 — Determining a second adjustment value of the first component by processing, using the at least one filter, a pixel value of one of a first chrominance component and a second chrominance component corresponding to the first component and at least one pixel value of at least one fourth component adjacent to the one of the first chrominance component and the second chrominance component 1130 — Adjusting a pixel value of the first component based on the first adjustment value and the second adjustment value

Determining a first adjustment value of a current chrominance component of a pixel by processing a luminance component corresponding to the current chrominance component and at least one first reference component adjacent to the luminance component — 1510

Determining a second adjustment value of the current chrominance component by processing one of a first chrominance component and a second chrominance component corresponding to the current chrominance component and at least one second reference component adjacent to the one of the first chrominance component and the second chrominance component — 1520

Adjusting a pixel value of the current chrominance component based on the first adjustment value and the second adjustment value — 1530

FIG. 15

METHODS AND SYSTEMS FOR VIDEO CODING

CROSS-REFERENCE TO RELATED APPLICATION

This application is a continuation of International Patent Application No. PCT/CN2022/076540, filed on Feb. 17, 2022, which claims priority to Chinese Patent Application No. 202110200049.1, filed on Feb. 22, 2021, and Chinese Patent Application No. 202110751426.0, filed on Jul. 2, 2021, the contents of each of which are hereby incorporated by reference.

TECHNICAL FIELD

The present disclosure generally relates to video compression technology, and in particular, to systems and methods for video coding.

BACKGROUND

In video coding, color coding techniques such as YUV, RGB, etc., may be commonly used. However, in an existing cross-component sample adaptive offset (CCSAO) technique, a count of available luminance modes may be limited, resulting in inaccurate classification of chrominance components, which affects an efficacy of image coding. Besides, in a current filtering technique, a cross-component adaptive loop filter (CCALF) only uses information of luminance components to adjust the chrominance components, and does not take information of the chrominance components into consideration, resulting in a poor adjustment effect.

Therefore, it is necessary to provide methods and systems for video coding, which takes a luminance component into consideration for a classification and/or filtering process of a chrominance component. Therefore, a chrominance component may be classified and/or adjusted more accurately, thereby improving a coding efficacy.

SUMMARY

An aspect of the present disclosure may relate to a method for video coding. The method for video coding may include: determining at least one classification mode of a first component of a first pixel for a block in an image frame based on at least one pixel value of at least one second component of at least one second pixel that surrounds the first pixel; generating a target classification result by classifying the first component based on at least a portion of the at least one classification mode; and compensating the first component based on an optimal compensation value of the target classification result.

In some embodiments, the first component may include a chrominance component, and each of the at least one second component may include a luminance component.

In some embodiments, a distance between the first component and each of the at least one second component may not exceed a range.

In some embodiments, the determining at least one classification mode of a first component of a first pixel for a block in an image based on at least one pixel value of at least one second component of at least one second pixel that surrounds the first pixel may include: determining at least one statistical value of the at least one pixel value of the at least one second component of the at least one second pixel that surrounds the first pixel; and determining the at least one classification mode of the first component based on the at least one statistical value and the at least one pixel value of the at least one second component.

In some embodiments, the at least one statistical value may include a maximum value, a minimum value, a median value, or an average value of the at least one pixel value of the at least one second component.

In some embodiments, the method for video coding may further comprise: determining whether one of the at least one second component corresponding to one of the at least one classification mode is outside a boundary associated with the block; in response to a determination result that the one of the at least one second component corresponding to the classification mode is outside the boundary, obtaining an updated classification mode based on the classification mode; and classifying the first component based on the updated classification mode.

In some embodiments, the boundary may include one or more of a boundary of the block, a boundary of a slice in the block, or a boundary of a patch in the block.

In some embodiments, the updated classification mode may be obtained by assigning a value to the classification mode.

In some embodiments, the value may be determined based on a pixel value of a third component of a third pixel adjacent to the one of the at least one second pixel.

In some embodiments, the method for video coding may further comprise: performing loop filtering on the compensated first component based on at least one filter.

Another aspect of the present disclosure may relate to a method for video coding. The method for video coding may include: determining a first adjustment value of a first component of a first pixel for a block in an image frame by processing, using at least one filter, a pixel value of a second component of a second pixel corresponding to the first component and at least one pixel value of at least one third component of at least one third pixel adjacent to the second pixel; determining a second adjustment value of the first component by processing, using the at least one filter, a pixel value of one of a first chrominance component and a second chrominance component corresponding to the first component and at least one pixel value of at least one fourth component adjacent to the one of the first chrominance component and the second chrominance component; and adjusting a pixel value of the first component based on the first adjustment value and the second adjustment value.

In some embodiments, the first component may include a chrominance component determined after a filtering operation is performed on the first chrominance component or the second chrominance component using an adaptive loop filter (ALF); and the second component may include a luminance component corresponding to the first chrominance component or the second chrominance component before the filtering operation is performed or another one of the first chrominance component and the second chrominance component.

In some embodiments, a shape of one of the at least one filter may be defined by one of the at least one third component or the at least one fourth component. The one of the at least one third component or the at least one fourth component may comprise at least one pixel along a vertical direction of one of the second component, the first chrominance component, or the second chrominance component, at least one pixel along a horizontal direction of the one of the second component, the first chrominance component, or the second chrominance component, at least one pixel along a first diagonal direction of the one of the second component, the first chrominance component, or the second chrominance component, and at least one pixel along a second diagonal direction of the one of the second component, the first chrominance component, or the second chrominance component. The horizontal direction, the vertical direction, the first diagonal direction, and the second diagonal direction may intersect at a position of the one of the second component, the first chrominance component, or the second chrominance component.

In some embodiments, the at least one filter may be determined based on a sampling format of the block.

In some embodiments, the method for video coding may further include: determining an optimal filter based on the at least one filter; and utilizing the optimal filter to determine the first adjustment value or the second adjustment value.

In some embodiments, the method for video coding may further include: allocating at least one index to the at least one filter, the at least one index being denoted as at least one syntactic element; and transmitting the at least one index to a decoding end during coding in the decoding end.

A further aspect of the present disclosure may relate to a system for video coding. The system may include at least one storage medium storing a set of instructions; at least one processor in communication with the at least one storage medium, when executing the stored set of instructions, the at least one processor may cause the system to: determine at least one classification mode of a first component of a first pixel for a block in an image frame based on at least one pixel value of at least one second component of at least one second pixel that surrounds the first pixel; generate a target classification result by classifying the first component based on at least a portion of the at least one classification mode; and compensate the first component based on an optimal compensation value of the target classification result.

In some embodiments, the first component may include a chrominance component, and each of the at least one second component includes a luminance component.

In some embodiments, a distance between the first component and each of the at least one second component may not exceed a range.

In some embodiments, to determine at least one classification mode of a first component of a first pixel for a block in an image based on at least one pixel value of at least one second component of at least one second that surrounds the first pixel, the at least one processor may cause the system to: determine at least one statistical value of the at least one pixel value of the at least one second component of the at least one second pixel that surrounds the first pixel; and determine the at least one classification mode of the first component based on the at least one statistical value and the at least one pixel value of the at least one second component.

In some embodiments, the at least one statistical value may include a maximum value, a minimum value, a median value, or an average value of the at least one pixel value of the at least one second component.

In some embodiments, the at least one processor may cause the system further to: determine whether one of the at least one second component corresponding to one of the at least one classification mode is outside a boundary associated with the block; in response to a determination result that the one of the at least one second component corresponding to the classification mode is outside the boundary, obtain an updated classification mode based on the classification mode; and classify the first component based on the updated classification mode.

In some embodiments, the boundary may include one or more of a boundary of the block, a boundary of a slice in the block, or a boundary of a patch in the block.

In some embodiments, the updated classification mode may be obtained by assigning a value to the classification mode.

In some embodiments, the value may be determined based on a pixel value of a third component of a third pixel adjacent to the one of the at least one second pixel.

In some embodiments, the at least one processor may cause the system further to: perform loop filtering on the compensated first component based on at least one filter.

A still further aspect of the present disclosure may relate to a non-transitory computer readable medium. The non-transitory computer readable medium may include executable instructions that, when executed by at least one processor, causing the at least one processor to effectuate a method comprising: determining at least one classification mode of a first component of a first pixel for a block in an image frame based on at least one pixel value of at least one second component of at least one second pixel that surrounds the first pixel; generating a target classification result by classifying the first component based on at least a portion of the at least one classification mode; and compensating the first component based on an optimal compensation value of the target classification result.

A still further aspect of the present disclosure may relate to a system for video coding. The system may include at least one storage medium storing a set of instructions; at least one processor in communication with the at least one storage medium, when executing the stored set of instructions, the at least one processor may cause the system to: determine a first adjustment value of a first component of a first pixel for a block in an image frame by processing, using at least one filter, a pixel value of a second component of a second pixel corresponding to the first component and at least one pixel value of at least one third component of at least one third pixel adjacent to the second pixel; determine a second adjustment value of the first component by processing, using the at least one filter, a pixel value of one of a first chrominance component and a second chrominance component corresponding to the first component and at least one pixel value of at least one fourth component adjacent to the one of the first chrominance component and the second chrominance component; and adjust a pixel value of the first component based on the first adjustment value and the second adjustment value.

In some embodiment, the first component may include a chrominance component determined after a filtering operation is performed on the first chrominance component or the second chrominance component using an adaptive loop filter (ALF). The second component may include a luminance component corresponding to the first chrominance component or the second chrominance component before the filtering operation is performed or another one of the first chrominance component and the second chrominance component.

In some embodiments, a shape of one of the at least one filter may be defined by one of the at least one third component or the at least one fourth component. The one of the at least one third component or the at least one fourth component may comprise at least one pixel along a vertical direction of one of the second component, the first chrominance component, or the second chrominance component, at least one pixel along a horizontal direction of the one of the second component, the first chrominance component, or the second chrominance component, at least one pixel along a first diagonal direction of the one of the second component, the first chrominance component, or the second chrominance component, and at least one pixel along a second diagonal direction of the one of the second component, the first chrominance component, or the second chrominance component. The horizontal direction, the vertical direction, the first diagonal direction, and the second diagonal direction may intersect at a position of the one of the second component, the first chrominance component, or the second chrominance component.

In some embodiments, the at least one filter may be determined based on a sampling format of the block.

In some embodiments, the at least one processor may cause the system further to: determine an optimal filter based on the at least one filter; and utilize the optimal filter to determine the first adjustment value or the second adjustment value.

A still further aspect of the present disclosure may relate to a non-transitory computer readable medium. The non-transitory computer readable medium may include executable instructions that, when executed by at least one processor, causing the at least one processor to effectuate a method comprising: determining a first adjustment value of a first component of a first pixel for a block in an image frame by processing, using at least one filter, a pixel value of a second component of a second pixel corresponding to the first component and at least one pixel value of at least one third component of at least one third pixel adjacent to the second pixel; determining a second adjustment value of the first component by processing, using the at least one filter, a pixel value of one of a first chrominance component and a second chrominance component corresponding to the first component and at least one pixel value of at least one fourth component adjacent to the one of the first chrominance component and the second chrominance component; and adjusting a pixel value of the first component based on the first adjustment value and the second adjustment value.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 2 is a flowchart illustrating an exemplary process for video coding according to some embodiments of the present disclosure;

FIG. 6A is a schematic diagram illustrating an exemplary filter according to some embodiments of the present disclosure;

FIG. 6B is a schematic diagram illustrating an exemplary filter according to some embodiments of the present disclosure;

FIG. 6C is a schematic diagram illustrating an exemplary filter according to some embodiments of the present disclosure;

FIG. 6D is a schematic diagram illustrating an exemplary filter according to some embodiments of the present disclosure;

FIG. 11 is a flowchart illustrating an exemplary process for video coding according to some embodiments of the present disclosure;

FIG. 15 is a flowchart illustrating an exemplary process for video coding according to some embodiments of the present disclosure.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is to describe particular example embodiments only and is not intended to be limiting. As used herein, the singular forms "a," "an," and "the" may be intended to include the plural forms as well, unless the context indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

The flowcharts used in the present disclosure illustrate operations that systems implement according to some embodiments of the present disclosure. It is to be expressly understood the operations of the flowcharts may be implemented not in order. Conversely, the operations may be implemented in an inverted order, or simultaneously. Moreover, one or more other operations may be added to the flowcharts. One or more operations may be removed from the flowcharts.

Figure 1:
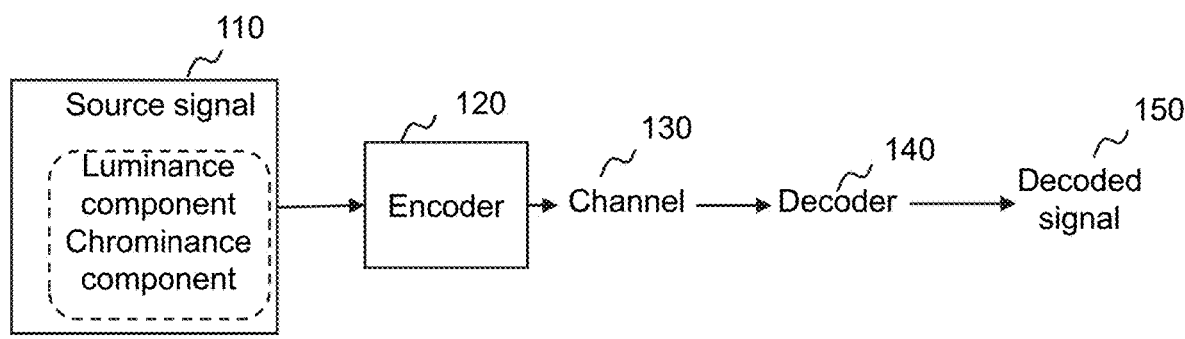
FIG. 1 is a schematic diagram illustrating an exemplary video coding system according to some embodiments of the present disclosure.

FIG. 1 is a schematic diagram illustrating an exemplary video coding system according to some embodiments of the present disclosure.

In some embodiments, a video coding system 100 may be applied to a video compression system, such as an air television broadcasting system, a cable television transmission system, a satellite television transmission system, an Internet video transmission system, a digital video stored in media, etc. As used herein, video compression may refer to the reduction of the amount of data required to represent a video, which aims at reducing redundant information of video data, thereby storing and transmitting the video data effectively.

As shown in FIG. 1, the video coding system 100 may include a source signal 110, an encoder 120, a channel 130, a decoder 140, and a decoded signal 150.

In some embodiments, the source signal 110 may include a source signal of a video, which is shortly referred to as a video source. In some embodiments, the video source may include various uncompressed dynamic images, such as dynamic images with a digital video format.

Each image frame of the video source may include a plurality of pixels. A color coding manner of the video source may include YUV or RGB, wherein Y represents a luminance component, U and V represent chrominance components, R represents red, G represents green, and B represents blue.

In some embodiments, the encoder 120 may refer to a first compression standard of the video source implemented by software and/or hardware applications. The encoder 120 may be configured to compress the video source signal in a transmission end.

In some embodiments, the decoder 140 may refer to a second compression standard of the video source implemented by software and/or hardware applications. The decoder 140 may be configured to reconstruct an approximation of the video source in a receiving end for playback.

In some embodiments, the channel 130 may include a wireless channel, a wired channel, or a frequency band that is used to transmit or store encoded video data. For example, the channel 130 may include a twisted pair, a cable, an optical fiber, or a medium capable of transmitting an electromagnetic wave, etc.

In some embodiments, the decoded signal 150 may refer to data reconstructed from the source signal 110 after being encoded and decoded. The decoded signal 150 may include video data after being compressed and decom pressed.

In some embodiments, the encoded video data may be stored in a hard disk. The encoded video data may be read from the hard disk for subsequent decoding processing.

In some embodiments, the video processing system 100 may include a channel encoder. The channel encoder may refer to a device or program that is configured to further encode the encoded source signal in the transmission end before the source signal is transmitted in the channel 130, thereby improving an error correction function. In some embodiments, the video processing system 100 may include a channel decoder. The channel decoder may be configured to detect and correct an error caused by the transmission of the encoded source signal in the receiving end. The encoded source signal may be decompressed by the decoder 140.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 10:
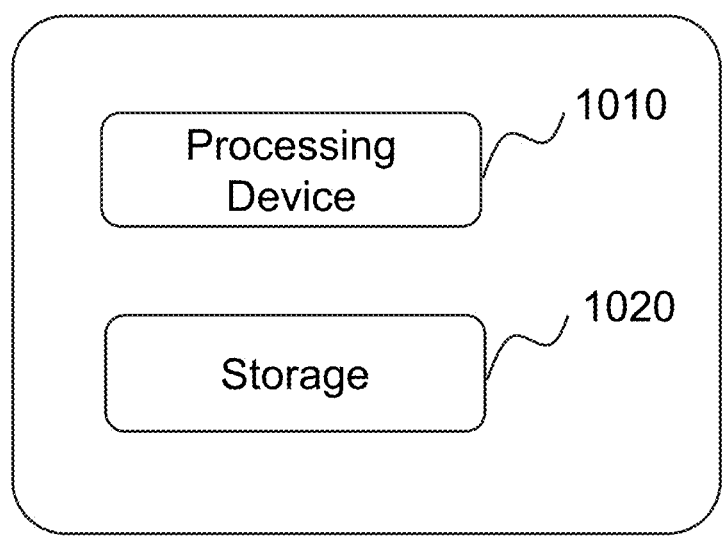
FIG. 10 is a block diagram illustrating an exemplary image compensation device according to some embodiments of the present disclosure.

FIG. 2 is a flowchart illustrating an exemplary process for video coding according to some embodiments of the present disclosure. In some embodiments, the process 200 may be implemented by an image compensation system (e.g., an image compensation system 700 illustrated in FIG. 7). In some embodiments, the image compensation system may be implemented by software and/or hardware, and/or may be integrated into an image compensation device (e.g., an image compensation device 1000 illustrated in FIG. 10) that includes a processing device (e.g., a processing device 1010). In some embodiments, at least part of the process 200 may be performed by the processing device including at least one processor and a storage device (e.g., a storage 1020). For example, the process 200 may be stored in the storage device in the form of instructions (e.g., an application), and invoked and/or executed by the processing device. The operations of the illustrated process presented below are intended to be illustrative. In some embodiments, the process 200 may be accomplished with one or more additional operations not described, and/or without one or more of the operations discussed. Additionally, the order in which the operations of the process 200 as illustrated in FIG. 2 and described below is not intended to be limiting. As shown in FIG. 2, the process 200 may include the following operations.

In 210, at least one classification mode of a first component of a first pixel for a block (also referred to as an image block) in an image (also referred to as an image frame) may be determined based on at least one pixel value of at least one second component of at least one second pixel that surrounds the first pixel in the block. In some embodiments, operation 210 may be implemented by a determination module 710.

In some embodiments, the first component may include a chrominance component (e.g., U, V). The chrominance component may be used to represent chrominance and describe a color and a saturation of at least a portion (e.g., the image block) of the image. In some embodiments, the second component may include a luminance component. The luminance component may be used to represent brightness, i.e., a gray value of the at least a portion (e.g., the image block) of the image.

A component block that are represented by one or more luminance components (i.e., first components) of first pixels may also be referred to as a luminance block (i.e., first component block), e.g., a luminance blocky A component block that are represented by one or more chrominance components (i.e., second components) of second pixels (i.e., the at least one second component) may also be referred to as a chrominance block (i.e., second component block), such as a chrominance block U and a chrominance block V. For example, the image block may include or be represented by one luminance block (e.g., Y) and two chrominance blocks (e.g., U, V). In some embodiments, the luminance block Y of the image block may correspond to the chrominance block U and the chrominance block V of the image block. In some embodiments, the chrominance block (U or V) of the image block may only correspond to the luminance block Y of the image block. Taking a 4:2:0 sampling format as an example, a size of a luminance block corresponding to an image block (N*M) may be N*M. A size of each of two chrominance blocks corresponding to the image block (N*M) may be (N/2)*(M/2). The size of the chrominance block may be ¼ of the size of the luminance block. That is, for an image block in a YUV420 color space format, a position of a chrominance component may correspond to positions of four luminance components. As shown in FIGS. 3 and 4A-4C chrominance components may be marked by solid lines, and 16 luminance components at corresponding positions may be marked by dashed lines. A chrominance component A may correspond to luminance components 4, 5, 7, and 8.

It should be noted that the present disclosure does not limit a marking manner, a marking order, a start marking number, etc., of the first component and the at least one second component. For example, numerical digits may be used for the marking, such as 1, 2, 3, . . . , or alphabet may be used for the marking, such as A, B, C, . . . . As another example, the start marking number may be 1, A, or other numerical digits or alphabets. As a further example, the marking may be regular, such as 2, 4, 6, . . . , or the marking may be unregular, such as 2, 3, 5, . . . . As still a further example, the marking may be implemented in the image block along a clockwise direction, a counterclockwise direction, etc.

Figure 3:
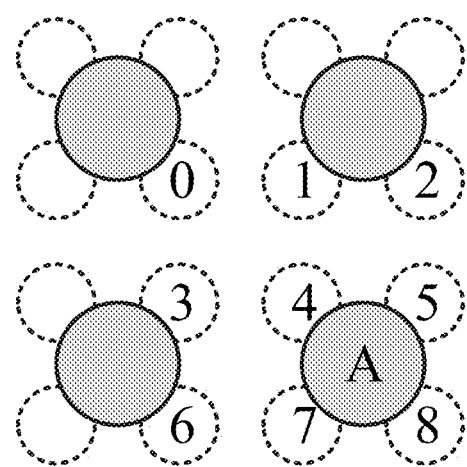
FIG. 3 is a schematic diagram illustrating an exemplary positional relationship of a first component of a first pixel and at least one second component of at least one second pixel according to some embodiments of the present disclosure.

As shown in FIG. 3, there are 9 types of second components numbered as 0-8 for the chrominance block. In some embodiments, a count of the second components may be increased by 2n, i.e., the count of the second components may be (9+2n), wherein n is a positive integer. For example, the count of the second components may be 11, 13, 15, etc. In some embodiments, the count of the second components may be increased by $n^2$, for example, 16, 25, 36, etc., i.e., the count of the second components may be (9+$n^2$), wherein n is a positive integer greater than 3.

In some embodiments, a distance between the first component and each of the at least one second component may not exceed a range. In some embodiments, the range may be defined by a pixel count, such as 2, 5, etc. In some embodiments, the at least one second component surrounding the first component may be a portion of or all of components within the range. The at least one second component may form a second component set.

In some embodiments, the second component set may include an adjacent second component set including at least one adjacent second component of the first component and a center second component set including at least one center second component of the first component. A center region of the at least one adjacent second component in the adjacent second component set may include the center second component set and be arranged centrosymmetrically. The central second component set may include 9 second components. As shown in FIG. 3, the central second component set may include 9 second components numbered as 0-8, and coordinates of the 9 second components may include (2x−1, 2y−1), (2x, 2y−1), (2x+1, 2y−1), (2x−1, 2y), (2x, 2y), (2x+1, 2y), (2x−1, 2y+1), (2x, 2y+1), (2x+1, 2y+1), wherein (x,y) is a coordinate of the first component, and the origin of a coordinate system may be a pixel in the upper left corner of the chrominance block.

Figure 4A:
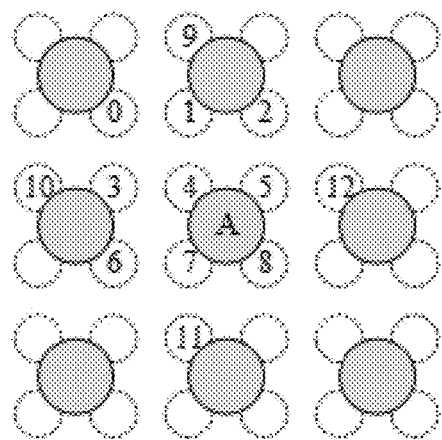
FIG. 4A is a schematic diagram illustrating an exemplary selection of at least one second component of at least one second pixel according to some embodiments of the present disclosure.

In some embodiments, a count of the at least one adjacent second component in the adjacent second component set may at least be 4, and a count of the at least one second component in the second component set may at least be 13. As shown in FIG. 4A, a solid line point may represent one first component, a dotted line point may represent one second component. Second components numbered as 0-12 may be selected for a first component A. In some embodiments, a coordinate system may be constructed with a pixel in the upper left corner of the chrominance block as the origin. In some embodiments, a coordinate system may be constructed with a pixel in the upper left corner of the luminance block corresponding to the chrominance block as the origin, coordinates of the first component may be (x,y), and luminance components with coordinates (2x, 2y−2), (2x−2, 2y), (2x, 2y+2), and (2x+2, 2y) may be selected to be the at least one second component in the second component set.

Figure 4B:
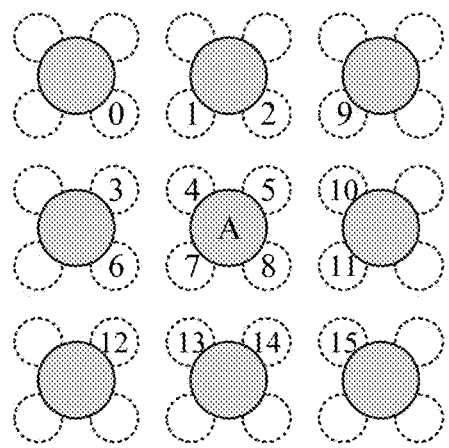
FIG. 4B is a schematic diagram illustrating an exemplary selection of at least one second component of at least one second pixel according to some embodiments of the present disclosure.

In some embodiments, a count of the at least one second component in the second component set may at least be 16. As shown in FIG. 4B, a solid line point may represent one first component, a dotted line point may represent one second component. Second components numbered as 0-15 may be selected for a first component A. In some embodiments, a coordinate system may be constructed with a pixel in the upper left corner of the chrominance block as the origin. In some embodiments, the coordinate system may be constructed with a pixel in the upper left corner of the luminance block corresponding to the chrominance block as the origin, coordinates of the first component may be (x, y), and luminance components with coordinates (2x−1, 2y−1), (2x, 2y−1), (2x+1, 2y−1), (2x−1, 2y), (2x, 2y), (2x+1, 2y), (2x−1, 2y+1), (2x, 2y+1), (2x+1, 2y+1), (2x+2, 2y−1), (2x+2, 2y), (2x+2, 2y+1), (2x−1, 2y+2), (2x, 2y+2), (2x+1, 2y+2), and (2x+2, 2y+2) may be selected to be the at least one second component in the second component set.

Figure 4C:
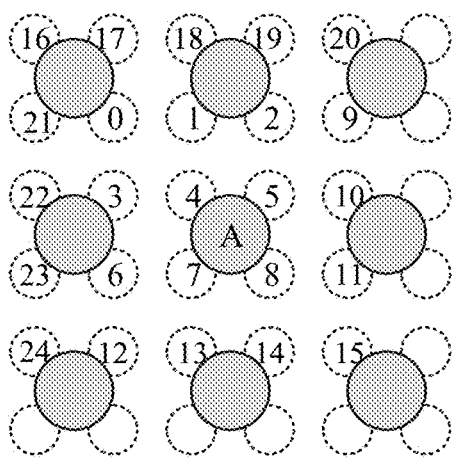
FIG. 4C is a schematic diagram illustrating an exemplary selection of at least one second component of at least one second pixel according to some embodiments of the present disclosure.

In some embodiments, the count of the at least one adjacent second component in the adjacent second component set may at least be 16, and the count of the at least one second component in the second component set may at least be 25. As shown in FIG. 4C, a solid line point may represent one first component, a dotted line point may represent one second component. Second components marked with 0-24 may be selected for a first component A. In some embodiments, a coordinate system may be constructed with a pixel in the upper left corner of the chrominance block as the origin. In some embodiments, the coordinate system may be constructed with a pixel in the upper left corner of the luminance block corresponding to the chrominance block as the origin, a coordinates of the first component may be (x, y), and luminance components with coordinates (2x+2, 2y−1), (2x+2, 2y), (2x+2, 2y+1), (2x−1, 2 y+2), (2x, 2y+2), (2x+1, 2y+2), (2x+2, 2y+2), (2x−2, 2y−2), (2x−1, 2y−2), (2x, 2y−2), (2x+1, 2y−2), (2x+2, 2y−2), (2x−2, 2y−1), (2x−2, 2y), (2x−2, 2y+1), and (2x−2, 2y+2) may be selected to be the at least one adjacent second component in the adjacent second component set, and luminance components with coordinates (2x−1, 2y−1), (2x, 2y−1), (2x+1, 2y−1), (2x−1, 2y), (2x, 2y), (2x+1, 2y), (2x−1, 2y+1), (2x, 2y+1), (2x+1, 2y+1), (2x+2, 2y−1), (2x+2, 2y), (2x+2, 2y+1), (2x−1, 2y+2), (2x, 2y+2), (2x+1, 2y+2), (2x+2, 2y+2), (2x−2, 2y−2), (2x−1, 2y−2), (2x, 2y−2), (2x+1, 2y−2), (2x+2, 2y−2), (2x−2, 2y−1), (2x−2, 2y), (2x−2, 2y+1), and (2x−2, 2y+2) may be selected to be the at least one second component in the second component set.

In some embodiments, at least one statistical value of the at least one pixel value of the at least one second component of the at least one second pixel that surrounds the first pixel may be determined. The at least one classification mode of the first component may be determined based on the at least one statistical value and the at least one pixel value of the at least one second component. Specifically, the at least one statistical value may be determined by performing a statistical analysis on the at least one pixel value of the at least one second component in the second component set. The at least one statistical value may be used as at least one value of a portion of the at least one classification mode, thereby increasing the count of the at least one classification mode of the first component.

There may be 9 types of second components numbered as 0-8 for the second component set as shown in FIG. 3. In some embodiments, a count of the at least one second component in the second component set may be increased by 2n. The count of the at least one second component in the second component set may be (9+2n+m), i.e., a count of the at least one classification mode may be (9+2n+m), wherein n is 0 or a positive integer, m is a positive integer, and m refers to a count of the at least one statistical value. In some embodiments, the count of the at least one second component in the second component set may be (9+n²+m), i.e., the count of the at least one classification mode may be (9+n²+m), wherein n is a positive integer greater than or equal to 3, m is a positive integer.

In some embodiments, each of the at least one classification mode may be used to classify the first component.

In some embodiments, the at least one classification mode may include at least one basic classification mode. Each of the at least one basic classification mode may refer to a classification mode that directly uses the at least one pixel value of the at least one second component, that is, a pixel value of each of the at least one second component may be designated as a value of one of the at least one basic classification mode. In some embodiments, the at least one classification mode may include at least one extended classification mode. Each of the at least one extended classification mode may refer to a classification mode that uses one of the at least one statistical value as the value of the classification mode, that is, each of the at least one statistical value may be designated as a value of one of the at least one extended classification mode. A count of the at least one extended classification mode may be 1, 2, or more. In some embodiments, the at least one classification mode may include a combination of the at least one basic classification mode and the at least one extended classification mode.

In some embodiments, the count of the at least one second component in the second component set may be (9+2n+m), that is, there may be (9+2n+m) classification modes, wherein n is 0 or a positive integer, and m is a positive integer. In some embodiments, the count of the at least one second component in the second component set may be (9+n²+m), that is, there may be (9+n²+m) classification modes, wherein n is a positive integer greater than or equal to 3, and m is a positive integer.

In some embodiments, each of the at least one statistical value may refer to a pixel value determined by performing a statistical analysis on the at least one pixel value of the at least one second component in the second component set.

In some embodiments, the at least one statistical value may include a maximum value, a minimum value, a median value, or an average value of at least a portion of the at least one pixel value of the at least one second component in the second component set. The count of the at least one second component may at least be 9. For example, an average value or a median value of all of the at least one pixel value of the at least one second component may be determined; or a maximum value or a minimum value among the all of the at least one pixel value of the at least one second component may be selected. As another example, a portion of the at least one second component may be selected, and an average value or a median value of a portion of the at least one pixel value of the portion of the at least one second component may be determined; or a maximum value or a minimum value among the portion of the at least one pixel value of the portion of the at least one second component may be selected.

The determination of the average value of the at least one pixel value of the at least one second component may include manners illustrated below. In some embodiments, relatively large pixel values of some second components among the at least one second component may be selected to determine the average value. For example, top a pixel values may be selected to determine the average value, wherein a is greater than or equal to 3 and smaller than the count of all of the at least one second component. In some embodiments, relatively small pixel values of some second components among the at least one second component may be selected to determine the average value. For example, last b pixel values may be selected to determine the average value, wherein b is greater than or equal to 3 and smaller than the count of all of the at least one second component. In some embodiments, an arrangement matrix of all of the at least one second component may be obtained. The average value of pixel values of second components on any symmetrical axis of the arrangement matrix may be determined. It should be noted that a statistical manner may be non-limiting in the present disclosure.

In some embodiments, the maximum value, the minimum value, the median value, or the average value may be determined by performing the statistics on the at least one second component in the second component set. In some embodiments, the maximum value, the minimum value, the median value, or the average value may be determined by performing the statistics on at least one center second component in the second component set.

In some embodiments, at least a portion of second components shown in FIGS. 3 and 4A-4C may be selected, and the maximum value, the minimum value, the median value, or the average value may be determined by performing the statistics on the at least a portion of the second components. For example, one or more of the maximum value, the minimum value, the median value, or the average value may be determined based on second components of a same group (e.g., a group as illustrated in FIG. 3A, a group as illustrated in 4A, a group as illustrated in 4B, or a group as illustrated in 4C). As another example, one or more of the maximum value, the minimum value, the median value, or the average value may be determined based on second components of different groups (e.g., a combination of the group as illustrated in FIG. 3A, the group as illustrated in 4B, or the group as illustrated in 4C).

For example, as shown in FIG. 3, pixel values of second components numbered as 0-8 may be selected, and the maximum value, the minimum value, the median value, or the average value of the 9 pixel values may be determined. Each of the maximum value, the minimum value, the median value, and the average value may be designated as a value of one extended classification mode, such that 4 extended classification modes may be obtained. As least one (e.g., 1, 2, 3, or 4) extended classification modes may be added with respect to 9 basic classification modes, thereby obtaining 10, 11, 12, or 13 classification modes. As another example, as shown in FIGS. 4A-4C, pixel values of second components numbered as 0-8 may be selected, and the maximum value, the minimum value, the median value, or the average value of the 9 pixel values may be determined. Each of the maximum value, the minimum value, the median value, and the average value may be designated as a value of one extended classification mode, such that 4 extended classification modes may be obtained. Additionally or alternatively, pixel values of second components numbered as 0-12 or 0-24 may be selected, and the maximum value, the minimum value, the median value, or the average value of the 13 or 25 pixel values may be determined. Each of the maximum value, the minimum value, the median value, and the average value may be designated as a value of one extended classification mode, such that 4 extended classification modes may be obtained.

By adding the at least one statistical value of the at least one pixel value of the at least one second component as the extended classification mode, The count of the at least one classification mode may be increased, thereby making subsequent classification of the first component more accurate.

In some embodiments, if one of the at least one second component corresponding to one of the at least one classification mode is outside a boundary, the first component may not be classified using the one of the at least one classification mode outside the boundary.

In some embodiments, the boundary may include one or more of a boundary of the image block, a boundary of a slice in the image block, a boundary of a patch in the image block, or a boundary of a largest coding unit (LCU) in the image block. A ratio (e.g., smaller than 1) of a size of the slice to a size of the LCU may be set according to practical demands. A ratio (e.g., smaller than 1) of a size of the patch to the size of the LCU may be also set according practical demands. In some embodiments, different boundaries may be processed by using different processing manners or the same processing manner. In some embodiments, an upper boundary, a lower boundary, a left boundary, and/or a right boundary may be processed by using the same processing manner or different processing manners.

Figure 5A:
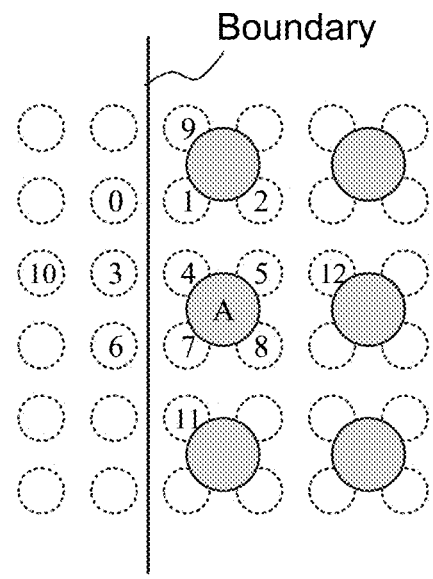
FIG. 5A is a schematic diagram illustrating at least one exemplary second component of at least one second pixel that is outside a boundary according to some embodiments of the present disclosure.

In some embodiments, if one of the at least one second component corresponding to the classification mode (e.g., a currently selected classification mode) is outside the boundary, the first component may not be classified using the classification mode outside the boundary. As shown in FIG. 5A, a left side of a solid line is outside the boundary, and a right side of the solid line is inside the boundary. If the classification mode is a classification mode 10, a first component A may not be classified using the classification mode 10. If the classification mode is a classification mode 9, the first component A may be classified using the classification mode 9.

In some embodiments, if one of the at least one second component corresponding to one of the at least one classification mode is outside the boundary, a value may be assigned to the classification mode, and the classification mode may be updated based on the value. Specifically, if one of the at least one second component corresponding to the classification mode is outside the boundary, a value of the classification mode may be updated by setting the value of the classification mode as a preset value, and the first component may be classified based on the classification mode with the preset value. As shown in 5A, if the classification mode is a classification mode 10, a pixel value of a second component 10 corresponding to the first component A may be set as the preset value for subsequent classification of the first component A.

In some embodiments, if one of the at least one second component corresponding to one of the at least one classification mode is outside the boundary, a pixel value of a third component of a third pixel adjacent to the at least one second pixel may be designated as the value of the classification mode, and the classification mode may be updated based on the value. As shown in FIG. 5A, if the classification mode is a classification mode 10, a third component adjacent to the second component 10 may be a component 3, and a pixel value of the component 3 may be designated as the value of the classification mode. If the component 3 is outside the boundary, the component 3 may be replaced by a component 4 for subsequent classification of the first component A.

Figure 5B:
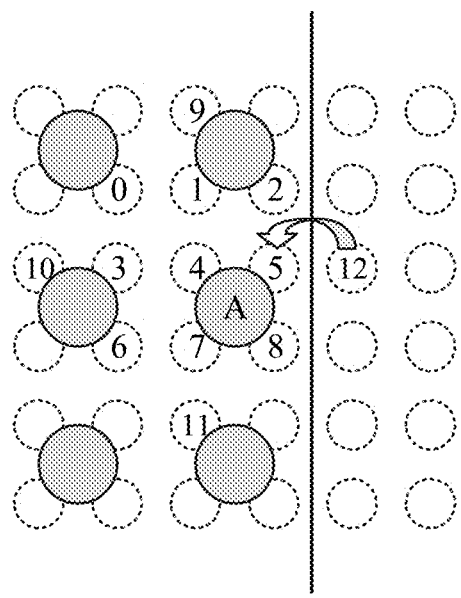
FIG. 5B is a schematic diagram illustrating at least one exemplary second component of at least one second pixel that is outside a boundary according to some embodiments of the present disclosure.

In some embodiments, as shown in FIGS. 5A-5B, if the boundary is the boundary of the image block, the boundary of the slice in the image block, or the boundary of the patch in the image block, and for an upper boundary and a left boundary of the image block, one of the at least one second component corresponding to the classification mode is outside the boundary, the first component may be not classified using the classification mode outside the boundary. For a lower boundary and a right boundary of the image block, the pixel value of the third component adjacent to the at least one second component may be designated as the value of the classification mode to update the classification mode, the first component may be classified based on the updated classification mode. If the boundary is a largest coding unit (e.g., LCU), for the upper boundary and the left boundary, if the classification mode is the classification mode 10, the pixel value of the third component 3 may be designated as the value of the classification mode to update the classification mode. If the classification mode is 0, 3, or 6, a pixel value of a corresponding second component may be designated as the value of the classification mode to update the classification mode. For the lower boundary and the right boundary of the image block, the pixel value of the third component adjacent to the at least one second component may be designated as the value of the classification mode to update the classification mode, and the first component may be classified based on the updated classification mode.

In some embodiments, if one of the at least one second component corresponding to one of the at least one classification mode is outside the boundary and the one of the at least one pixel value of the at least one second component is obtained, the one of the at least one pixel value of the second component may be designated as the value of the classification mode to update the classification mode (also referred to as an updated classification mode). The first component may be classified based on the updated classification mode. As shown in FIG. 5A, if the boundary in FIG. 5A is the boundary of the slice, the boundary of the patch, or the boundary of LCU, all pixel values of all second components in the FIG. 5A may be obtained. If the classification mode is a classification mode 10, a pixel value of the second component 10 may be designated as the value of the classification mode to update the classification mode. The first component A may be classified based on the updated classification mode.

The present disclosure may provide various boundary processing manners which may be used in cross-combination, in combination with the above-mentioned classification mode selection manners, or in combination with an existing classification mode selection manner, thereby improving the coding efficacy (e.g., increasing a compression ratio).

In 220, a target classification result may be generated by classifying the first component based on at least a portion of the at least one classification mode, and the first component may be compensated based on an optimal compensation value of the target classification result. In some embodiments, operation 220 may be implemented by a compensation module 720.

In some embodiments, a target classification mode may be obtained or determined from the at least one classification mode. For example, for each of the at least one classification mode, the compensation module 720 may classify first components of the image block according to the classification mode to obtain a classification result. The compensation module 720 may determine a cost for each of at least one classification result determined based on the at least one classification mode. The compensation module 720 may determine one of the at least one classification mode with a minimum cost as the target classification mode. The target classification result may be generated by classifying the first components using the target classification mode.

In some embodiments, the target classification result may include multiple types of the first components (e.g., types 0-15). For each of the multiple types of the first components, an optimal compensation value may be determined. First components that belong to the same type may correspond to the same optimal compensation value. In some embodiments, the optimal compensation value for first components in the same type may be determined based on a rate distortion optimization (RDO) process. Then, the first components of the same type may be compensated based on the optimal compensation value.

In some embodiments, a prediction value of the first component may be obtained after compensating the first component based on the optimal compensation value. A code stream of the image block may be obtained by using the prediction value to code the image frame.

In some embodiments, one of the at least one classification mode may need a syntax representation (e.g., a syntactic element). An encoding end may encode a syntax corresponding to the classification mode, and a decoding end may decode the syntax to obtain the corresponding classification mode, and corresponding operations (e.g., for classifying the first component and/or compensating the first component based on the target classification result may be performed. The code stream of the image block may include a syntactic element of the classification mode. The syntactic element may be used to represent which classification mode is used to classify the first component. The syntactic element of the classification mode may be ccsao_type, and different values of the syntactic element may be used to represent different classification modes. A manner for obtaining at least one pixel value (e.g., a pixel value of the first component) at the boundary may be predetermined and/or similar to the boundary processing manners as mentioned above, and the encoding end and the decoding end may perform operations based on the predetermined manner without the syntax representation. As shown in FIG. 4C, taking 13 classification modes as an example, syntactic values of the 13 classification modes may be illustrated in table (1) below. The classification modes may correspond to values of the syntactic element of ccsao_type one by one. When there are more classification modes, the values of the syntactic element of ccsao_type may be determined according to a sequence of serial numbers of the classification modes, which may not be described herein.

TABLE 1

| Classification mode | Value of ccsao_type |
|---|---|
| Mode corresponding to position 0 | 0 |
| Mode corresponding to position 1 | 1 |
| Mode corresponding to position 2 | 2 |
| Mode corresponding to position 3 | 3 |
| Mode corresponding to position 4 | 4 |
| Mode corresponding to position 5 | 5 |
| Mode corresponding to position 6 | 6 |
| Mode corresponding to position 7 | 7 |
| Mode corresponding to position 8 | 8 |
| Mode corresponding to position 9 | 9 |
| Mode corresponding to position 10 | 10 |
| Mode corresponding to position 11 | 11 |
| Mode corresponding to position 12 | 12 |

The present disclosure may provide various classification modes for classifying the first component, optional classification modes may be enriched, thereby more accurately compensating the first component of the image, improving the quality of a reconstructed image, and/or improving a coding efficacy (e.g., increasing a compression ratio). In addition, different boundary processing manners may be provided for processing different boundaries, so that at least one first component at the boundary may also be classified and compensated. At the same time, by increasing the boundary processing manners, a pixel range for the pixel compensation may be increased, thereby improving the quality of the reconstructed image, and further improving a compression efficacy (e.g., increasing a compression ratio).

In some embodiments, loop filtering may be performed on the compensated first component based on at least one filter.

In some embodiments, the loop filtering may be performed on the compensated first component in an encoding operation based on the at least one filter, or the loop filtering may be performed on the compensated first component in a decoding operation based on the at least one filter.

The loop filtering may be a process of adjusting pixel values in a reconstructed image after the whole image frame is reconstructed. The loop filtering may be implemented by at least one of an adaptive loop filter (ALF) and a cross-component adaptive loop filter (CCALF). The ALF may obtain a filtering coefficient by utilizing a rhombic filter and Wiener filtering (WF) at a coding end and filter the luminance component and the chrominance component, thereby reducing an image distortion.

In some embodiments, a first adjustment value of the compensated first component may be determined by processing a pixel value of a second component of a second pixel corresponding to the compensated first component and at least one pixel value of at least one third component of at least one third pixel adjacent to the second pixel. In some embodiments, a difference (also referred to as a first difference) between a pixel value of each third component and the pixel value of the second component may be determined. Then, the first adjustment value of the compensated first component may be determined based on all first differences corresponding to all third components. In some embodiments, the first difference between the pixel value of each third component before the loop filtering and the pixel value of the second component before the loop filtering may be determined.

In some embodiments, a second adjustment value of the compensated first component may be determined by processing a pixel value of one of a first chrominance component or a second chrominance component corresponding to the compensated first component and at least one pixel value of at least one fourth component adjacent to the first chrominance component or the second chrominance component. In some embodiments, the first chrominance component and the second chrominance component may be different chrominance components in the image frame. For example, assuming a format of the image frame which the compensated first component belongs to is a YUV format, the first chrominance component may be a U component and the second chrominance component may be a V component; alternatively, the first chrominance component may be the V component and the second chrominance component may be the U component. In some embodiments, a difference (also referred to as a second difference) between a pixel value of each fourth component adjacent to the first chrominance component and a pixel value of the first chrominance component may be determined. Then, the second adjustment value of the compensated first component may be determined based on all second differences corresponding to all fourth components. In some embodiments, the second difference between the pixel value of each fourth component and the pixel value of the first chrominance component before the loop filtering may be determined. In some embodiments, the second difference between the pixel value of each fourth component adjacent to the second chrominance component and a pixel value of the second chrominance component may be determined. Then, the second adjustment value of the compensated first component may be determined based on all second differences corresponding to all fourth components.

In some embodiments, after a filtering operation is performed on the compensated first component using an adaptive loop filter (ALF), the first adjustment value and/or the second adjustment value of the compensated first component may be determined. The compensated first component after the filtering operation may include a chrominance component determined after a filtering operation is performed on the first chrominance component or the second chrominance component using the ALF. The second component corresponding to the compensated first component may include a luminance component corresponding to the compensated first component before the filtering operation is performed or another one of the first chrominance component and the second chrominance component.

In some embodiments, if the pixel value of the compensated first component is the pixel value of the first chrominance component, there may be multiple manners for adjusting a filtering operation of the pixel value of the second chrominance component corresponding to the compensated first component using the CCALF. For example, the filtering operation may be performed on the pixel value of the second chrominance component corresponding to the compensated first component using the CCALF only based on luminance component information. Specifically, the pixel value of the second chrominance component corresponding to the compensated first component may be adjusted based on the first adjustment value. As another example, the filtering operation may be performed on the pixel value of the second chrominance component corresponding to the compensated first component using the CCALF based on the luminance component information and second chrominance component information (e.g., a pixel value of the second chrominance component). Assuming that the second chrominance component is a U component and the first chrominance component is a V component, a third adjustment value may be determined by processing the pixel value of the second chrominance component corresponding to the compensated first component and the at least one pixel value of the at least one third component. Then the pixel value of the second chrominance component corresponding to the compensated first component may be adjusted based on the first adjustment value and the third adjustment value. As another example, the filtering operation may be performed on the pixel value of the second chrominance component corresponding to the compensated first component using the CCALF based on the luminance component information and first chrominance component information (e.g., a pixel value of the first chrominance component). Assuming that the second chrominance component is a V component and the first chrominance component is a U component, a fourth adjustment value may be determined by processing the pixel value of the second chrominance component corresponding to the compensated first component and the at least one pixel value of the at least one fourth component. Then the pixel value of the second chrominance component corresponding to the compensated first component may be adjusted based on the first adjustment value and the fourth adjustment value.

In some embodiments, if the pixel value of the compensated first component is the pixel value of the second chrominance component, there may be multiple manners for adjusting the filtering operation of the pixel value of the second chrominance component corresponding to the compensated first component using the CCALF, which may be similar to a condition that the pixel value of the compensated first component is the pixel value of the first chrominance component, and be not repeated herein.

In some embodiments, there may be eight improvement strategies for the image frame in the YUV format.

(1) Strategy A:

For a filtering operation using the CCALF, the first adjustment value may be determined based on the luminance component, the second adjustment value may be determined based on the V component, and the filtering operation of the U component may be performed based on the first adjustment value and the second adjustment value by using the CCALF. The filtering operation of the V component may be performed merely based on the first adjustment value by using the CCALF.

(2) Strategy B:

For a filtering operation using the CCALF, the first adjustment value may be determined based on the luminance component, the second adjustment value may be determined based on the V component, the filtering operation of the U component may be performed based on the first adjustment value and the second adjustment value by using the CCALF, and the filtering operation of the V component may be performed based on the first adjustment value and the second adjustment value by using the CCALF. The strategy B may be selected when the pixel value of the V component before the filtering operation using the ALF is performed is close to an original value, such that the pixel values of the two chrominance components may be adjusted by using more accurate information of the V component, thereby improving the adjustment effect of the filtering operation using the CCALF. The strategy B may also be suitable for other situations, which may not be limited herein.

(3) Strategy C:

For a filtering operation using the CCALF, the first adjustment value may be determined based on the luminance component, the second adjustment value may be determined based on the V component, the filtering operation of the U component may be performed based on the first adjustment value and the second adjustment value by using the CCALF. A third adjustment value may be determined based on the U component. The filtering operation of the V component may be performed based on the first adjustment value and the third adjustment value using the CCALF.

(4) Strategy D:

For a filtering operation using the CCALF, the first adjustment value may be determined based on the luminance component, the second adjustment value may be determined based on the U component, the filtering operation of the U component may be performed based on the first adjustment value and the second adjustment value by using the CCALF. The filtering operation of the V component may be performed only based on the first adjustment value by using the CCALF.

(5) Strategy E:

For a filtering operation using the CCALF, the first adjustment value may be determined based on the luminance component, the second adjustment value may be determined based on the U component, the filtering operation of the U component may be performed based on the first adjustment value and the second adjustment value by using the CCALF, and the filtering operation of the V component may be performed based on the first adjustment value and the second adjustment value by using the CCALF. The strategy E may be selected when the pixel value of the U component before the filtering operation using the ALF is performed is close to an original value, such that the pixel values of the two chrominance components may be adjusted by using more accurate information of the U component, thereby improving the adjustment effect of the filtering operation using the CCALF. The strategy E may also be suitable for other situations, which may not be limited herein.

(6) Strategy F:

For a filtering operation using the CCALF, the first adjustment value may be determined based on the luminance component, the second adjustment value may be determined based on the U component, and the filtering operation of the U component may be performed based on the first adjustment value and the second adjustment value by using the CCALF. A third adjustment value may be determined based on the V component, and the filtering operation of the V component may be performed based on the first adjustment value and the third adjustment value by using the CCALF.

(7) Strategy G:

For a filtering operation using the CCALF, the first adjustment value may be determined based on the luminance component, the second adjustment value may be determined based on the U component, and the filtering operation of the V component may be performed based on the first adjustment value and the second adjustment value by using the CCALF. The filtering operation of the U component may be performed only based on the first adjustment value using the CCALF.

(8) Strategy F:

For a filtering operation using the CCALF, the first adjustment value may be determined based on the luminance component, the second adjustment value may be determined based on the V component, and the filtering operation of the V component may be performed based on the first adjustment value and the second adjustment value by using the CCALF. The filtering operation of the U component may be performed only based on the first adjustment value by using the CCALF.

In some embodiments, the above operations may be performed by the at least one filter and the first adjustment value and the second adjustment value of the compensated first component may be obtained. In some embodiments, the at least one filter may use a target pixel as a center point, and select at least one second component adjacent to the target pixel from near to far from the target pixel, and determine an adjustment value of the compensated first component based on the selected at least one second component. It should be understood that the first adjustment value and the second adjustment value of the compensated first component may be referred to as the adjustment values of the compensated first component, and the target pixel may refer to the second component, the first chrominance component, or the second chrominance component corresponding to the compensated first component.

In some embodiments, the at least one filter may determine the first adjustment value d according to formula: $d=\Sigma_{i=0}^{6} f(i)*diff(i))/128$, where f(i) represents a coefficient corresponding to each third or fourth component adjacent to the target pixel, and diff(i) may represent the first difference or the second difference corresponding to each third or fourth component adjacent to the target pixel. Since different filters may select different third or fourth components adjacent to the target pixel, there may be one or more types of filters in the present disclosure.

Figures 6A, 6B, 6C, 6D:
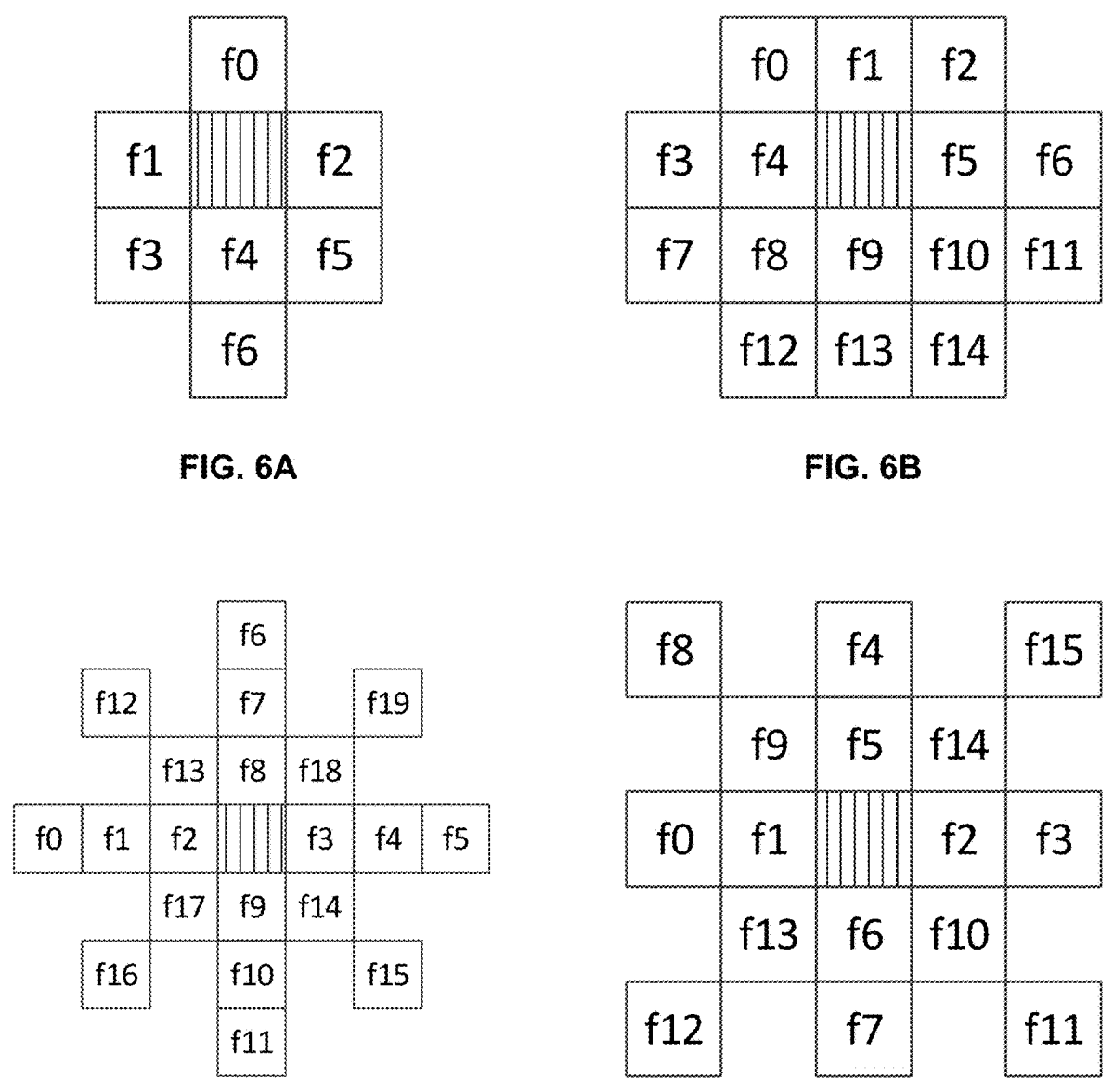

In some embodiments, a shape of one of the at least one filter may be defined by one of the at least one third component or the at least one fourth component. The one of the at least one third component or the at least one fourth component may include at least one pixel along a vertical direction of the target pixel, at least one pixel along a horizontal direction of the target pixel, at least one pixel along a first diagonal direction of the target pixel, and at least one pixel along a second diagonal direction of the target pixel. The horizontal direction, the vertical direction, the first diagonal direction, and the second diagonal direction may intersect at a position of the target pixel. An angle between the horizontal direction and the first diagonal direction may be within a first angle range, for example, 30 degrees-45 degrees, 45 degrees-60 degrees, etc. An angle between the horizontal direction and the second diagonal direction may be within a second angle range, for example, 30 degrees-45 degrees, 45 degrees-60 degrees, etc. For example, the one of the at least one third component or the at least one fourth component may include at least one pixel (e.g., one pixel, two pixels) in the upper side of the target pixel, at least one pixel (e.g., one pixel, two pixels) in the left side of the target pixel, at least one pixel (e.g., one pixel, two pixels) in the right side of the target pixel, at least one pixel (e.g., one pixel, two pixels) in the lower side of the target pixel, at least one pixel (e.g., one pixel, two pixels) in the lower left side of the target pixel, at least one pixel (e.g., one pixel, two pixels) in the lower right side of the target pixel, at least one pixel (e.g., one pixel, two pixels) in the upper left side of the target pixel, and at least one pixel (e.g., one pixel, two pixels) in the upper right side of the target pixel. In such cases, the shape of the filter may be denoted as " ■ " e.g., as shown in FIG. 6C or FIG. 6D. A pixel filled by vertical lines may represent the target pixel (x, y), and unfilled pixels may be third or fourth components surrounding the target pixel selected by the filter, that is, the filter may select 7 third or fourth components surrounding the target pixel. Coordinates of the 7 third or fourth components are (x, y−1), (x−1, y), (x+1, y), (x−1, y−1), (x, y−1), (x+1, y−1), (x−2, y), where f0~f6 in FIG. 6A may be coefficients (also referred to as weighting coefficients) corresponding to each third or fourth component surrounding the target pixel.

In some embodiments, a shape of one of the at least one filter may be rhombic as shown in FIG. 6B. The one of the at least one third component or the at least one fourth component may include at least one pixel (e.g., one pixel, two pixels) in the left side of the target pixel, at least one pixel (e.g., one pixel, two pixels) in the right side of the target pixel, at least one pixel (e.g., one pixel, two pixels, three pixels) of a row in the upper side of the target pixel, at least one pixel (e.g., one pixel, two pixels, three pixels, four pixels, five pixels) of a first lower row in the lower side of the target pixel, at least one pixel (e.g., one pixel, two pixels, three pixels) of a second lower row in the lower side of the target pixel. The second lower row may be lower than the first lower row, and there no other rows between the first lower row and the second lower row. A pixel filled by vertical lines may represent the target pixel (x, y), and unfilled pixels may be third or fourth components surrounding the target pixel selected by the filter, that is, the filter may select 15 third or fourth components surrounding the target pixel. The 15 third or fourth components may form a continuous area. Coordinates of the 15 third or fourth components may be (x−1, y−1), (x, y−1), (x+1, y−1) (x−2, y), (x−1, y), (x+1, y), (x+2, y), (x−2, y+1), (x−1, y+1), (x, y+1), (x+1, y+1), (x+2, y+1), (x−1, y+2), (x, y+2), (x+1, y+2), where f0~f14 in FIG. 6B may be coefficients corresponding to each third or fourth component surrounding the target pixel.

In some embodiments, a shape of one of the at least one filter may be " ■ " as shown in FIG. 6C. A pixel filled with vertical lines may represent a target pixel (x, y), and unfilled pixels may represent third or fourth components surrounding the target pixel and selected by the filter, that is, the filter may select 20 third or fourth components surrounding the target pixel. The 20 third or fourth components may be incompletely continuous. Coordinates of the 20 third or fourth components may be (x, y−3), (x−2, y−2), (x, y−2), (x+2, y−2), (x−1, y−1), (x, y−1), (x+1, y−1), (x−3, y), (x−2, y), (x−1, y), (x+1, y), (x+2, y), (x+3, y), (x−1, y+1), (x, y+1), (x+1, y+1), (x−2, y+2), (x, y+2), (x, y+3), wherein f0~f19 in FIG. 6C may be coefficients corresponding to each third or fourth component surrounding the target pixel, respectively.

In some embodiments, a shape of one of the at least one filter may be " ■ " as shown in FIG. 6D. A pixel filled with vertical lines may represent a target pixel (x, y), and unfilled pixels may be third or fourth components surrounding the target pixel and selected by the filter, that is, the filter may select 16 third or fourth components surrounding the target pixel. Coordinates of the 16 third or fourth components may be (x−2, y−2), (x, y−2), (x+2, y−2), (x−1, y−1), (x, y−1), (x+1, y−1), (x−2, y), (x−1, y), (x+1, y) (x+2, y), (x−1, y+1), (x, y+1), (x+1, y+1), (x−2, y+2), (x, y+2), (x+2, y+2), where f0~f15 in FIG. 6D may be coefficients corresponding to each third or fourth component surrounding the target pixel.

In some embodiments, the third or fourth components selected by the filter may be connected into a continuous area, be incompletely continuous, or include some discrete pixels. In some embodiments, the filter may select pixels in a horizontal direction, a longitudinal direction and an oblique direction of the target pixel as the third or fourth components of the target pixel.

In some embodiments, at least one type of the at least one filter used in the loop filtering may be the same or different. In some embodiments, a count of the third or fourth components selected by the at least one filter used in the loop filtering may be the same or different. At least one shape of the at least one filter used in the loop filtering may be the same or different.

In some embodiments, before the first adjustment value and/or the second adjustment value of the compensated first component is determined by using the at least one filter, a coefficient corresponding to each third or fourth component may be determined. In some embodiments, the coefficient of each third or fourth component in the filter may be determined by Wiener filtering.

In some embodiments, the pixel value of the compensated first component after the adjustment may be determined by performing a weighted and/or fusion operation on the first adjustment value, the second adjustment value, and the pixel value of the compensated first component. In some embodiments, the pixel value of the compensated first component after the adjustment may be determined by performing a weighted and/or fusion operation on the first adjustment value, the second adjustment value, and the pixel value of the compensated first component after the loop filtering, such that the pixel value of the compensated first component after a filtering operation by using the ALF is performed may be adjusted.

In some embodiments, a temporary adjustment value of the compensated first component may be determined by performing a weighted and/or fused operation on the first adjustment value and the second adjustment value. Then the pixel value of the compensated first component after the adjustment may be obtained by performing a weighted and/or fused operation on the temporary adjustment value of the compensated first component and the pixel value of the compensated first component after a filtering operation by using the ALF is performed. In some embodiments, weighting coefficients of the first adjustment value and the second adjustment value may be set based on an actual situation, respectively, which may not be limited herein. For example, the weighting coefficients of the first adjustment value and the second adjustment value may be 0.5, respectively.

By using the first adjustment value and the second adjustment value to adjust the pixel value of the compensated first component, the pixel value of the compensated first component after the adjustment may be closer to an original value (e.g., an actual value) of the first component, thereby improving a restoration degree of the image.

In some embodiments, the at least one filter may be selected from a plurality of filters based on a sampling format of the block. The loop filtering may be performed on the compensated first component by using the at least one filter.

In some embodiments, there may be the plurality of filters. At least one filter may be selected from the plurality of filters and designated as the at least one first filter. A first adjustment value of the compensated first component may be determined by processing, using the at least one first filter, the pixel value of the second component and the at least one pixel value of at least one third component adjacent to the second component. At least one filter may be selected from the plurality of filters and designated as at least one second filter. A second adjustment value of the compensated first component may be determined by processing, using the at least one second filter, the pixel value of the one of the first chrominance component or the second chrominance component corresponding to the compensated first component and the at least one pixel value of the at least one fourth component adjacent to the one of the first chrominance component and the second chrominance component. A temporary adjustment value of the compensated first component may be obtained by performing a weighted and/or a fused operation on the first adjustment value corresponding to the selected at least one first filter and the second adjustment value corresponding to the selected at least one second filter. Then the pixel value of the compensated first component after the adjustment may be determined by performing a weighted and/or a fused operation on the temporary adjustment value of the compensated first component and the pixel value of the first component after a filtering operation using the ALF is performed.

In some embodiments, at least one type of the at least one first filter for determining the first adjustment value and at least one type of the at least one second filter for determining the second adjustment value may be the same or different.

In some embodiments, the at least one first filter and/or the at least one second filter may be selected based on a sampling format of the image block. For example, if the sampling format of the image block is YUV420, a filter shown in FIG. 6A may be designated as one first filter and one second filter, respectively. As another example, if the sampling format of the image block is YUV444, a filter shown in FIG. 6B may be designated as one first filter and a filter shown in FIG. 6C may be designated as one second filter.

In some embodiments, an optimal filter may be determined based on the at least one filter. The loop filtering may be performed on the compensated first component by using the optimal filter. The optimal filter may be used to determine at least one of the first adjustment value, the second adjustment value, the third adjustment value, or the fourth adjustment value. Specifically, at least one filtering effect of the at least one filter may be compared, and a filter with the best filtering effect may be designated as the optimal filter. The best filtering effect may refer that a difference between an original image and an image obtained after the loop filtering is performed on the original image is the smallest. Then, the loop filtering as mentioned above may be performed on the compensated first component by using the optimal filter.

In some embodiments, a filter of a first predetermined index may be designated as a first filter, and a filter of a second predetermined index may be designated as a second filter. For example, the first predetermined index may include "0" and "1". Each filter with the index "0" and "1" may be designated as the first filter for determining the first adjustment value. The second predetermined index may include "3". Each filter with the index "3" may be designated as the second filter for determining the second adjustment value. The first predetermined index and the second predetermined index may be determined by a user of a video processing system (e.g., the video processing system 100).

In some embodiments, at least one filter of a first count, at least one index of which is smaller than a first index threshold, may be designated as the at least one first filter. At least one filter of a second count, at least one index of which is smaller than a second index threshold, may be designated as the at least one second filter. The first count and the second count may be determined based on an actual situation and not be limited herein. For example, if the first count is 3, a filter of an index "0", "1," or "2" may be designated as one first filter. As another example, the second count is 1, a filter of an index "0" may be designated as one second filter.

In some embodiments, the weighting coefficient of the first adjustment value corresponding to the selected at least one first filter and the weighting coefficient of the second adjustment value corresponding to the selected at least one second filter may be determined based on an actual situation and not be limited herein.

In some embodiments, in order to facilitate the encoding end or the decoding end to filter the compensated first component by using the same filter and the same filtering coefficient, different indexes may be allocated to the at least one filter. For an encoding operation in the encoding end, an index of a filter that is selected to determine the first adjustment value may be denoted as a syntactic element, and the index may be transmitted, such that the decoding end knows which filter is used to execute in a decoding operation. In addition, a filtering coefficient of the filter may be transmitted to the decoding end. In some embodiments, an index of a filter that is selected to determine the second adjustment value may be denoted as a syntactic element, and the index may be transmitted, such that the decoding end knows which filter is used to execute the decoding operation. In addition, a filtering coefficient of the filter may be transmitted to the decoding end.

In some embodiments, the encoding end and the decoding end may use the same first filter. Thus, the encoding end may be unnecessary to encode the index of the same first filter into the code stream. In some embodiments, the encoding end and the decoding end may use the same second filter. Thus, the encoding end may be unnecessary to encode the index of the same second filter into the code stream.

In some embodiments, whether it is necessary to determine the second adjustment value may be determined based on the sampling format of the image block. If it is unnecessary to determine the second adjustment value, the pixel value of the compensated first component may be adjusted directly based on the first adjustment value.

In some embodiments, after the loop filtering is performed on the compensated first component based on the at least one filter, the image block may be encoded based on a result obtained after the loop filtering is performed on the decoder, and an encoded code stream may be obtained. In some embodiments, a reconstruction value of the first component may be determined based on the encoded code stream. The reconstruction value may refer to a prediction value without compensation.

Figure 7:
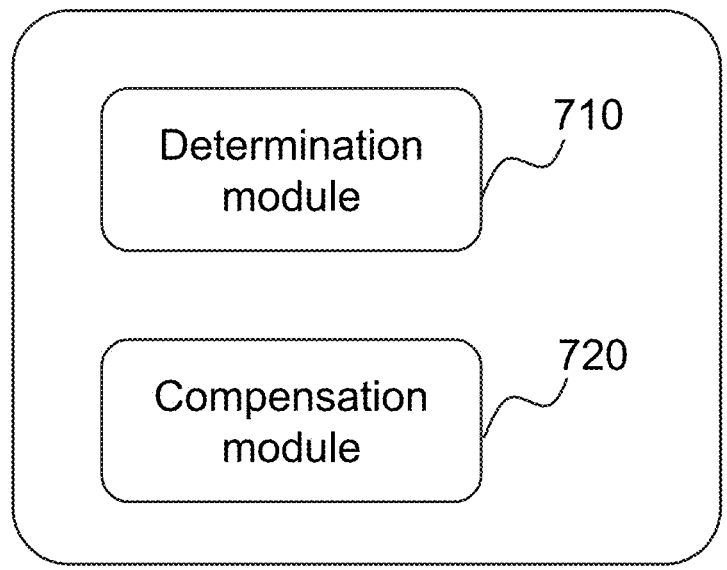
FIG. 7 is a block diagram illustrating an exemplary image compensation system according to some embodiments of the present disclosure.

FIG. 7 is a block diagram illustrating an exemplary image compensation system according to some embodiments of the present disclosure. As shown in FIG. 7, an image compensation system 700 may include a determination module 710 and a compensation module 720.

In some embodiment, the determination module 710 may be configured to determine a classification mode of a first component for a block in an image frame based on at least one pixel value of at least one second component that surrounds the first pixel. In some embodiments, the first component may include a chrominance component (e.g., U, V). The chrominance component may be used to represent chrominance and describe a color and a saturation of at least a portion (e.g., the image block) of the image. In some embodiments, the second component may include a luminance component. The luminance component may be used to represent brightness, i.e., a gray value of the at least a portion (e.g., the image block) of the image. More descriptions of the determination of the classification mode of the first component may be found elsewhere in the present disclosure, for example, operation 210 in FIG. 2.

In some embodiments, the compensation module 720 may be configured to generate a target classification result by classifying the first component based on the classification mode. The compensation module 720 may also be configured to compensate the first component based on an optimal compensation value of the target classification result. In some embodiments, the compensation module 720 may obtain or determine a target classification mode from the at least one classification mode. For example, for each of the at least one classification mode, the compensation module 720 may classify first components of the image block according to the classification mode to obtain a classification result. The compensation module 720 may determine a cost for each of at least one classification result determined based on the at least one classification mode. The compensation module 720 may determine one of the at least one classification mode with a minimum cost as the target classification mode. The compensation module 720 may generate the target classification result by classifying the first components using the target classification mode. More descriptions of the generation of the target classification result may be found elsewhere in the present disclosure, for example, operation 220 in FIG. 2.

Figure 8:
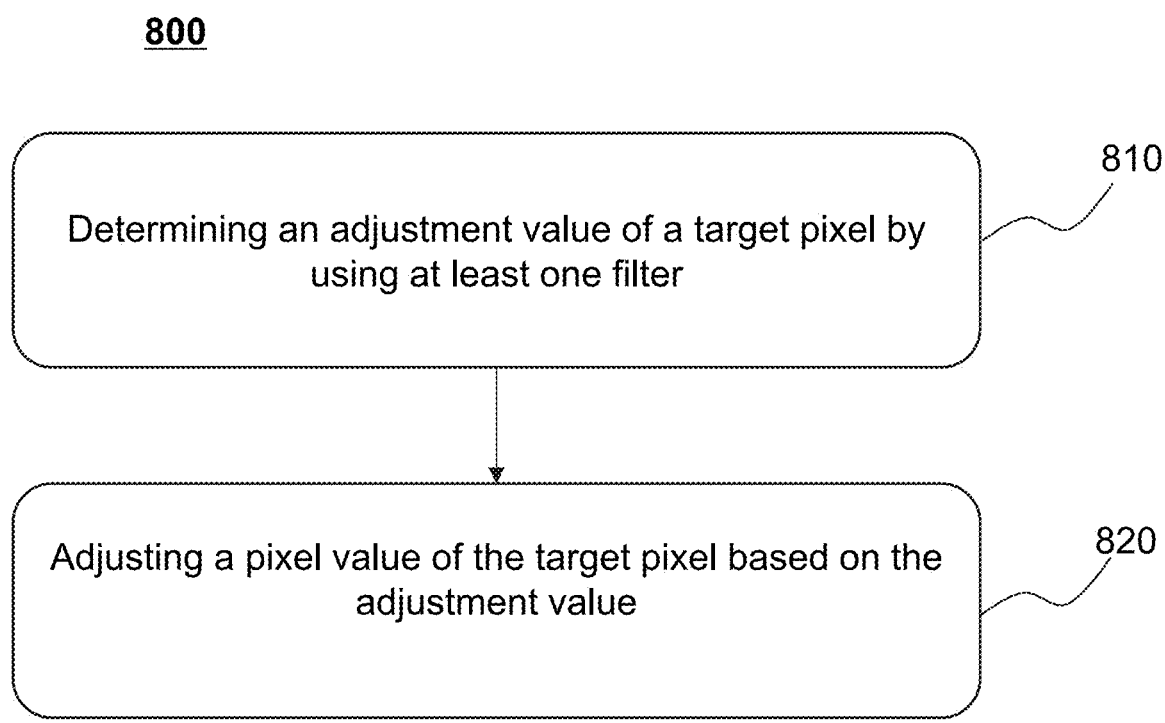
FIG. 8 is a flowchart illustrating an exemplary process for video coding according to some embodiments of the present disclosure.

FIG. 8 is a flowchart illustrating an exemplary process for video coding according to some embodiments of the present disclosure. In some embodiments, the process 800 may be implemented by an image compensation system (e.g., an image compensation system 900 illustrated in FIG. 9). In some embodiments, the image compensation system may be implemented by software and/or hardware, and/or may be integrated into an image compensation device (e.g., an image compensation device 1000 illustrated in FIG. 10) that includes a processing device (e.g., a processing device 1010). In some embodiments, at least part of the process 800 may be performed by the processing device including at least one processor and a storage device (e.g., a storage 1020). For example, the process 800 may be stored in the storage device in the form of instructions (e.g., an application), and invoked and/or executed by the processing device. The operations of the illustrated process presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below is not intended to be limiting.

In 810, an adjustment value of a target pixel may be determined by using at least one filter. The target pixel may refer to the first component, the first chrominance component, or the second chrominance component corresponding to the first component as illustrated in FIGS. 2-7. The at least one filter may refer to the at least one filter as illustrated in FIGS. 2-7. The process for determining the adjustment value of the target pixel by using the at least one filter may be the same as or similar to the process for determining the first adjustment value, the second adjustment value, the third adjustment value, or the fourth adjustment value using the at least one filter as illustrated in FIGS. 2-7, more descriptions of which are not repeated. In some embodiments, operation 810 may be implemented by a determination module 910.

In 820, a pixel value of the target pixel may be adjusted based on the adjustment value. The process for adjusting the pixel value of the target pixel based on the adjustment value may be the same as or similar to the process for adjusting the pixel value of the compensated first pixel based on the first adjustment value, the second adjustment value, the third adjustment value, or the fourth adjustment value as illustrated in FIGS. 2-7, more descriptions of which are not repeated. In some embodiments, operation 820 may be implemented by an adjustment module 920.

In some embodiments, the target pixel may be compensated to obtain a compensated target pixel, an adjustment value of the compensated target pixel may be determined, then the pixel value of the compensated target pixel may be adjusted based on the adjustment value of the compensated target pixel. The process for compensating the target pixel may be the same as or similar to the process for compensating the first component as illustrated in FIGS. 2-7, more descriptions of which are not repeated.

Figure 9:
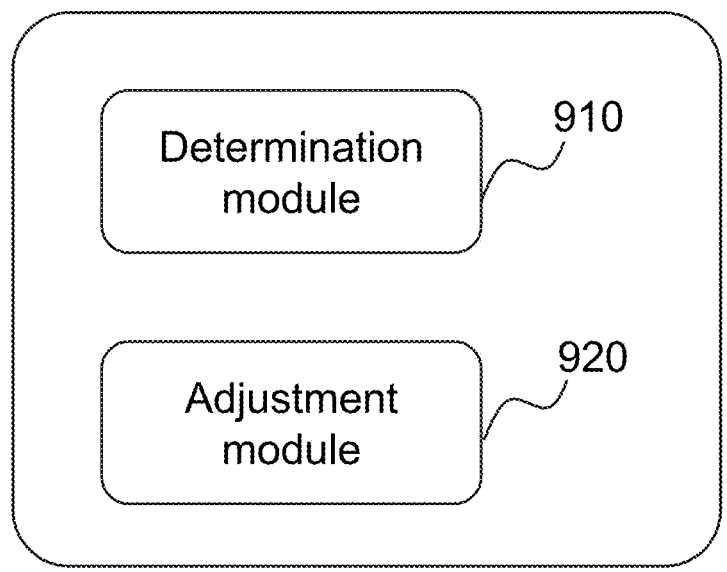
FIG. 9 is a block diagram illustrating an exemplary image compensation system according to some embodiments of the present disclosure.

FIG. 9 is a block diagram illustrating an exemplary image compensation system according to some embodiments of the present disclosure. As shown in FIG. 9, an image compensation system 900 may include a determination module 910 and an adjustment module 920.

The determination module 910 may be configured to determine an adjustment value of a target pixel by using at least one filter. The target pixel may refer to the first component, the first chrominance component, or the second chrominance component corresponding to the first component as illustrated in FIGS. 2-7. The at least one filter may refer to the at least one filter as illustrated in FIGS. 2-7. The process for determining the adjustment value of the target pixel by using the at least one filter may be the same as or similar to the process for determining the first adjustment value, the second adjustment value, the third adjustment value, or the fourth adjustment value using the at least one filter as illustrated in FIGS. 2-7, more descriptions of which are not repeated.

The adjustment module 920 may be configured to adjust a pixel value of the target pixel based on the adjustment value. In some embodiments, the adjustment module 920 may compensate the target pixel to obtain a compensated target pixel, determine an adjustment value of the compensated target pixel, then adjust the pixel value of the compensated target pixel based on the adjustment value of the compensated target pixel. The process for compensating the target pixel may be the same as or similar to the process for compensating the first component as illustrated in FIGS. 2-7, more descriptions of which are not repeated.

FIG. 11 is a flowchart illustrating an exemplary process for video coding according to some embodiments of the present disclosure.

In 1110, a first adjustment value of a first component of a first pixel for a block in an image frame may be determined by processing, using at least one filter, a pixel value of a second component of a second pixel corresponding to the first component and at least one pixel value of at least one third component of at least one third pixel adjacent to the second pixel. In some embodiments, the process for determining the first adjustment value in 1110 may be the same as or similar to the process for determining the first adjustment value of the compensated first component in FIG. 2, more descriptions of which are not repeated.

In 1120, a second adjustment value of the first component may be determined by processing, using the at least one filter, a pixel value of one of a first chrominance component and a second chrominance component corresponding to the first component and at least one pixel value of at least one fourth component adjacent to the one of the first chrominance component and the second chrominance component. In some embodiments, the first component may include a chrominance component determined after a filtering operation is performed on the first chrominance component or the second chrominance component using an adaptive loop filter (ALF). The second component may include a luminance component corresponding to the first chrominance component or the second chrominance component before the filtering operation is performed or another one of the first chrominance component and the second chrominance component. In some embodiments, the process for determining the second adjustment value in 1120 may be the same as or similar to the process for determining the second adjustment value of the compensated first component in FIG. 2, more descriptions of which are not repeated.

In 1130, a pixel value of the first component may be adjusted based on the first adjustment value and the second adjustment value. In some embodiments, the process for adjusting the pixel value of the first component in 1130 may be the same as or similar to the process for adjusting the pixel value of the compensated first component in FIG. 2, more descriptions of which are not repeated.

Figure 12:
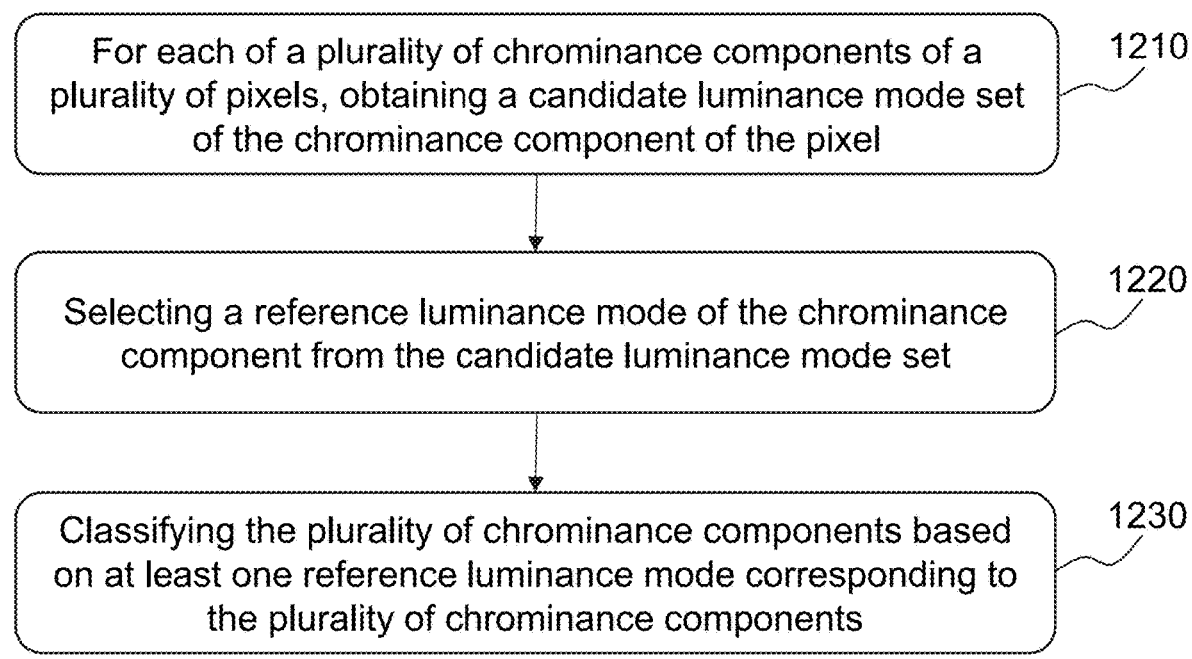
FIG. 12 is a flowchart illustrating an exemplary process for video coding according to some embodiments of the present disclosure.

FIG. 12 is a flowchart illustrating an exemplary process for video coding according to some embodiments of the present disclosure.

In 1210, for each of a plurality of chrominance components of a plurality of pixels, a candidate luminance mode set of the chrominance component of the pixel may be obtained. The chrominance component may be an example of the first component in 210, and the candidate luminance mode set may be an example of the at least one classification mode in FIG. 2. For example, the candidate luminance mode set may include at least 10 candidate luminance modes. In some embodiments, the process for obtaining the candidate luminance mode set in 1210 may be the same as or similar to the process for obtaining the at least one classification mode in FIG. 2, more descriptions of which are not repeated.

In 1220, a reference luminance mode of the chrominance component may be selected from the candidate luminance mode set. One candidate luminance mode of the candidate luminance mode set may be selected as the reference luminance mode of the chrominance component. The reference luminance mode may correspond to one or more chrominance components among the plurality of chrominance components. In some embodiments, the reference luminance mode may be an example of the target classification mode in FIG. 2. The process for selecting the reference luminance mode in 1220 may be the same as or similar to the process for determining the target classification mode in FIG. 2, the descriptions of which are not repeated.

In 1230, the plurality of chrominance components may be classified based on at least one reference luminance mode corresponding to the plurality of chrominance components. The plurality of chrominance components may be classified into at least one group, and chrominance components in a same group may be considered to be as the same type. In some embodiments, the processing for classifying the chrominance components in 1230 may be the same as or similar to the process for classifying the first components in FIG. 2, more descriptions of which are not repeated.

Figure 13:
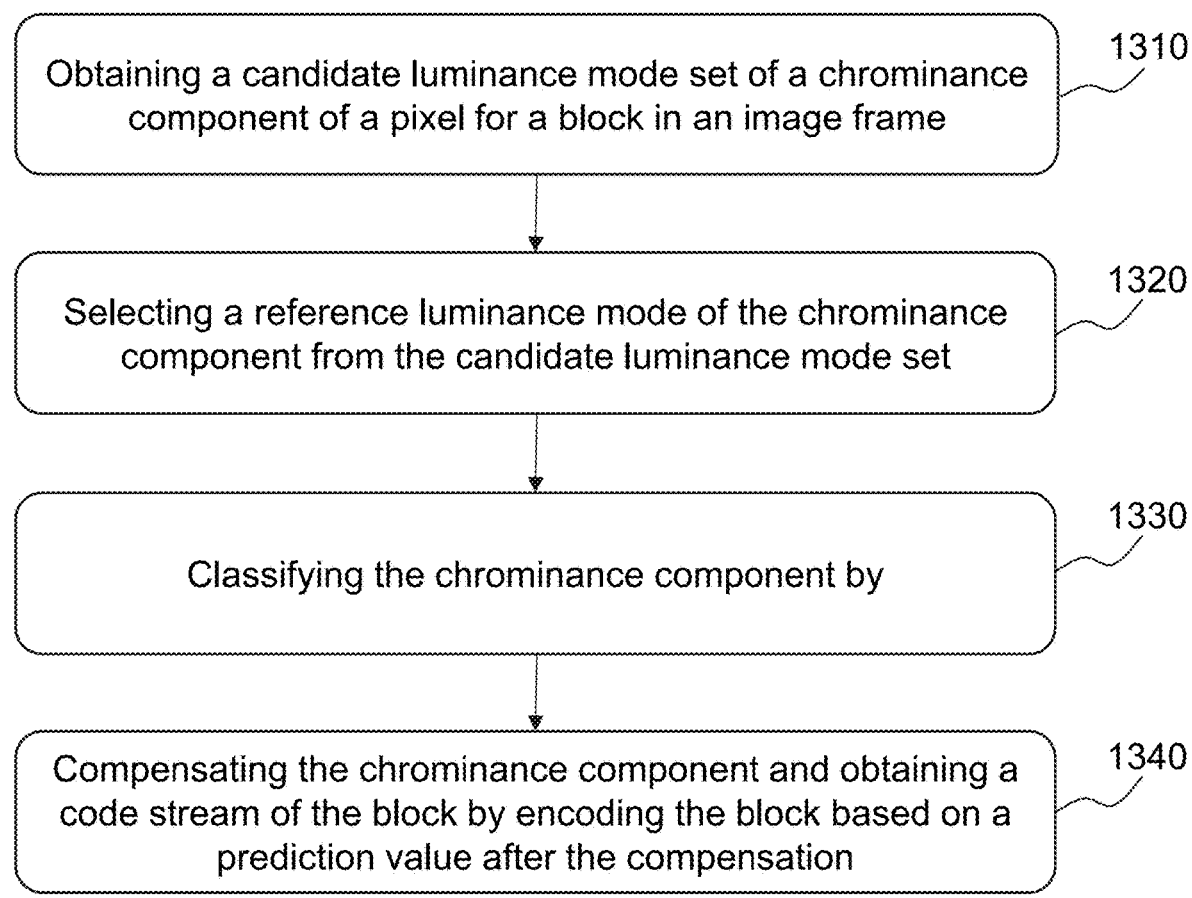
FIG. 13 is a flowchart illustrating an exemplary process for video coding according to some embodiments of the present disclosure.

FIG. 13 is a flowchart illustrating an exemplary process for video coding according to some embodiments of the present disclosure.

In 1310, a candidate luminance mode set of a chrominance component of a pixel for a block in an image frame may be obtained. The candidate luminance mode set may be an example of the at least one classification mode in FIG. 2. In some embodiments, the process for obtaining the candidate luminance mode set in 1310 may be the same as or similar to the process for obtaining the at least one classification mode in FIG. 2, more descriptions of which are not repeated.

In 1320, a reference luminance mode of the chrominance component may be selected from the candidate luminance mode set. In some embodiments, the reference luminance mode may be an example of the target classification mode in FIG. 2. The process for selecting the reference luminance mode in 1320 may be the same as or similar to the process for determining the target classification mode in FIG. 2, the descriptions of which are not repeated.

In 1330, the chrominance component may be classified by processing a luminance component corresponding to the reference luminance mode.

In 1340, the chrominance component may be compensated, and a code stream of the block may be obtained by encoding the block based on a prediction value after the compensation. More descriptions of the compensation of the chrominance component and/or the obtainment of the code stream may be found elsewhere in the present disclosure, for example, FIG. 2 and the descriptions thereof.

Figure 14:
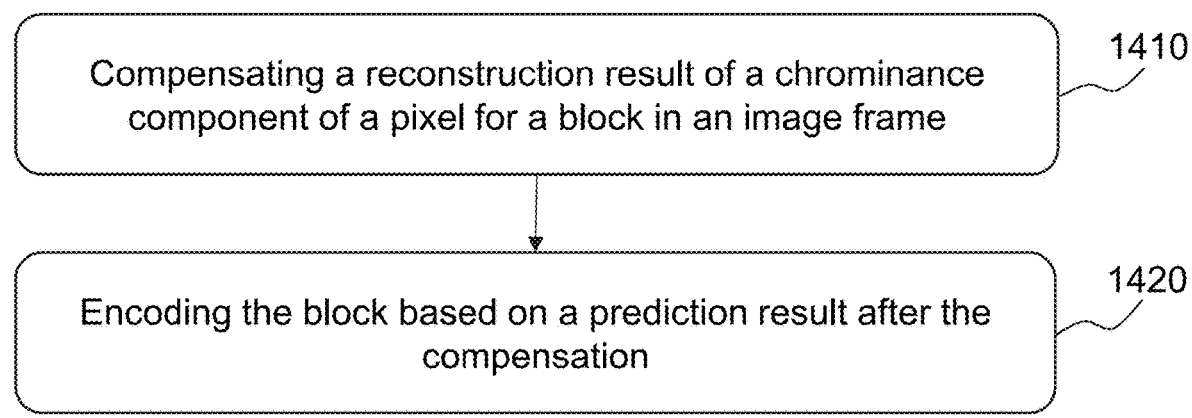
FIG. 14 is a flowchart illustrating an exemplary process for video coding according to some embodiments of the present disclosure.

FIG. 14 is a flowchart illustrating an exemplary process for video coding according to some embodiments of the present disclosure.

In 1410, a reconstruction result (e.g., a reconstruction value) of a chrominance component of a pixel for a block in an image frame may be compensated. In some embodiments, during loop filtering, a classification result may be generated by classifying the chrominance component, and the reconstruction result of the chrominance component of the pixel may be compensated based on the classification result. The process for compensating the reconstruction result of the chrominance component of the pixel in 1410 may be the same as or similar to the process for compensating the first component in FIG. 2, more descriptions of which are not repeated.

In 1420, the block may be encoded based on a prediction result (e.g., a prediction value) after the compensation.

FIG. 15 is a flowchart illustrating an exemplary process for video coding according to some embodiments of the present disclosure.

In 1510, a first adjustment value of a current chrominance component of a pixel may be determined by processing a luminance component corresponding to the current chrominance component and at least one first reference component adjacent to the luminance component. The current chrominance component may be an example the first component in FIG. 11, and the luminance component may be an example of the second component in FIG. 11. The process for determining the first adjustment value in 1510 may be the same as or similar to the process for determining the first adjustment value in FIG. 2, more descriptions of which are not repeated herein.

In 1520, a second adjustment value of the current chrominance component may be determined by processing one of a first chrominance component and a second chrominance component corresponding to the current chrominance component and at least one second reference component adjacent to the one of the first chrominance component and the second chrominance component. The process for determining the second adjustment value in 1520 may be the same as or similar to the process for determining the second adjustment value in FIG. 2, more descriptions of which are not repeated herein.

In 1530, a pixel value of the current chrominance component may be adjusted based on the first adjustment value and the second adjustment value. The process for adjusting the pixel value of the current chrominance component in 1530 may be the same as or similar to the process for adjusting the pixel value of the compensated first component in FIG. 2, more descriptions of which are not repeated herein.

Figure 16:
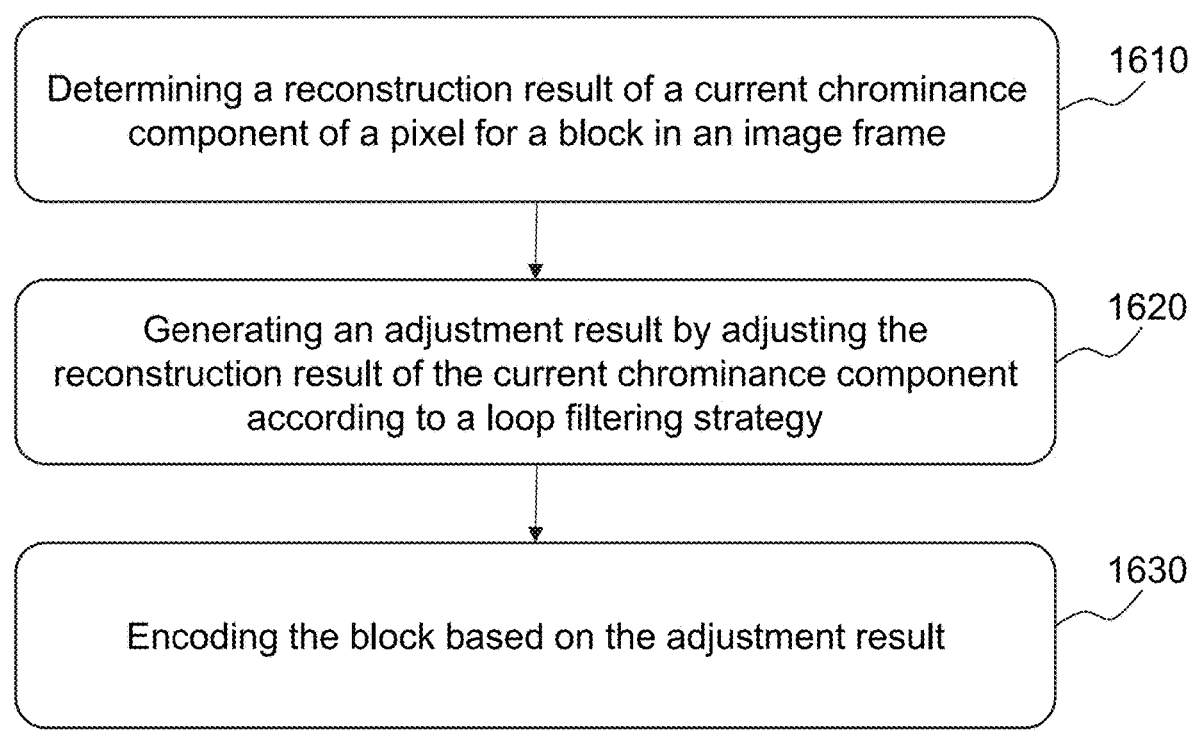
FIG. 16 is a flowchart illustrating an exemplary process for video coding according to some embodiments of the present disclosure.

FIG. 16 is a flowchart illustrating an exemplary process for video coding according to some embodiments of the present disclosure.

In 1610, a reconstruction result of a current chrominance component of a pixel for a block in an image frame may be determined. The reconstruction result of the current chrominance component may include a reconstruction value of the current chrominance component. The current chrominance component may be an example the first component in FIG. 11.

In 1620, an adjustment result may be generated by adjusting the reconstruction result of the current chrominance component according to a loop filtering strategy (e.g., the strategy A-F in FIG. 2). The adjustment result may include at least one of the first adjustment value, the second adjustment value, the third adjustment value, or the fourth adjustment value in FIG. 2, and more descriptions of the generation of the adjustment result are not repeated.

In 1630, the block may be encoded based on the adjustment result.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended for those skilled in the art, though not expressly stated herein. These alterations, improvements, and modifications are intended to be suggested by this disclosure and are within the spirit and scope of the exemplary embodiments of this disclosure.

Meanwhile, certain terminology has been used to describe embodiments of the present disclosure. For example, the terms "one embodiment," "an embodiment," and/or "some embodiments" mean that a particular feature, structure, or characteristic described in connection with the embodiment is in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in smaller than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for video coding, comprising:
   determining at least one classification mode of a first component of a first pixel for a block in an image frame based on at least one pixel value of at least one second component of at least one second pixel, wherein the at least one second component of the at least one second pixel has a distance with the first component of the first pixel and the distance does not exceed a range, the first component includes a chrominance component, and each of the at least one second component includes a luminance component, and the determining the at least one classification mode includes:
   designating a pixel value of one of the at least one second component or one of at least one statistical value of the at least one first component as a value of one of the at least one classification mode;
   generating a target classification result by classifying the first component based on at least a portion of the at least one classification mode; and
   compensating the first component based on an optimal compensation value of the target classification result.

2. The method of claim 1, wherein the determining at least one classification mode of a first component of a first pixel for a block in an image based on at least one pixel value of at least one second component of at least one second that surrounds the first pixel includes:
   determining at least one statistical value of the at least one pixel value of the at least one second component of the at least one second pixel that surrounds the first pixel, wherein each of the at least one statistical value refers to a value determined by performing a statistical analysis on the at least one pixel value of the at least one second component.

3. The method of claim 2, wherein the at least one statistical value includes a maximum value, a minimum value, a median value, or an average value of the at least one pixel value of the at least one second component.

4. The method of claim 1, further comprising:
   determining whether one of the at least one second component corresponding to one of the at least one classification mode is outside a boundary associated with the block;
   in response to a determination result that the one of the at least one second component corresponding to the classification mode is outside the boundary,
   obtaining an updated classification mode based on the classification mode; and
   classifying the first component based on the updated classification mode.

5. The method of claim 4, wherein the boundary includes one or more of a boundary of the block, a boundary of a slice in the block, or a boundary of a patch in the block.

6. The method of claim 4, wherein the updated classification mode is obtained by assigning a value to the classification mode.

7. The method of claim 6, wherein the value is determined based on a pixel value of a third component of a third pixel adjacent to the one of the at least one second pixel.

8. The method of claim 1, further comprising:
   performing loop filtering on the compensated first component based on at least one filter.

9. A system for video coding, comprising:
   at least one storage medium storing a set of instructions;
   at least one processor in communication with the at least one storage medium, when executing the stored set of instructions, the at least one processor causes the system to:
   determine at least one classification mode of a first component of a first pixel for a block in an image frame based on at least one pixel value of at least one second component of at least one second pixel, wherein the at least one second component of the at least one second pixel has a distance with the first component of the first pixel and the distance does not exceed a range, the first component includes a chrominance component, and each of the at least one second component includes a luminance component, and to determine the at least one classification mode, the at least one processor causes the system further to:
   designate a pixel value of one of the at least one second component or one of at least one statistical value of the at least one first component as a value of one of the at least one classification mode;
   generate a target classification result by classifying the first component based on at least a portion of the at least one classification mode; and
   compensate the first component based on an optimal compensation value of the target classification result.

10. The system of claim 9, wherein to determine at least one classification mode of a first component of a first pixel for a block in an image based on at least one pixel value of at least one second component of at least one second that surrounds the first pixel, the at least one processor causes the system to:
   determine at least one statistical value of the at least one pixel value of the at least one second component of the at least one second pixel that surrounds the first pixel, wherein each of the at least one statistical value refers to a value determined by performing a statistical analysis on the at least one pixel value of the at least one second component.

11. The system of claim 10, wherein the at least one statistical value includes a maximum value, a minimum value, a median value, or an average value of the at least one pixel value of the at least one second component.

12. The system of claim 9, wherein the at least one processor causes the system further to:
   determine whether one of the at least one second component corresponding to one of the at least one classification mode is outside a boundary associated with the block;
   in response to a determination result that the one of the at least one second component corresponding to the classification mode is outside the boundary,
   obtain an updated classification mode based on the classification mode; and
   classify the first component based on the updated classification mode.

13. The system of claim 12, wherein the boundary includes one or more of a boundary of the block, a boundary of a slice in the block, or a boundary of a patch in the block.

14. The system of claim 12, wherein the updated classification mode is obtained by assigning a value to the classification mode.

15. The system of claim 14, wherein the value is determined based on a pixel value of a third component of a third pixel adjacent to the one of the at least one second pixel.

16. The method of claim 1, wherein generating a target classification result by classifying the first component based on at least a portion of the at least one classification mode includes:
classifying the first component according to each of the at least one classification mode to obtain at least one classification result;
determining a cost for each of the at least one classification result determined based on the at least one classification mode;
determining one of the at least one classification mode with a minimum cost as a target classification mode;
classifying the first component using the target classification mode to obtain the target classification result, the target classification result including multiple types of the first component.

17. The method of claim 1, wherein compensating the first component based on an optimal compensation value of the target classification result includes:
determining the optimal compensation value for the target classification result based on a rate distortion optimization (RDO) process;
compensating the first component based on the optimal compensation value of the target classification result, the compensating the first component being configured to encode an image frame to obtain a code stream for the block in the image frame.

18. The method of claim 6, wherein
if one of the at least one second component corresponding to one of the at least one classification mode is outside the boundary and the one of the at least one pixel value of the at least one second component is obtained, the value determined based on the one of the at least one pixel value of the second component is designated as the value of the classification mode.

19. The system of claim 9, wherein to generate a target classification result by classifying the first component based on at least a portion of the at least one classification mode, the at least one processor causes the system further to:
classify the first component according to each of the at least one classification mode to obtain at least one classification result;
determine a cost for each of the at least one classification result determined based on the at least one classification mode;
determine one of the at least one classification mode with a minimum cost as a target classification mode;
classify the first component using the target classification mode to obtain the target classification result, the target classification result including multiple types of the first component.

* * * * *